(12) United States Patent
Song

(10) Patent No.: US 12,340,465 B2
(45) Date of Patent: Jun. 24, 2025

(54) INTERFERENCE POINT DETERMINING METHOD AND APPARATUS, STORAGE MEDIUM, AND MULTI-CHANNEL LiDAR

(71) Applicant: SUTENG INNOVATION TECHNOLOGY CO., LTD., Shenzhen (CN)

(72) Inventor: Yan Song, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 386 days.

(21) Appl. No.: 18/088,749

(22) Filed: Dec. 26, 2022

(65) Prior Publication Data

US 2023/0215089 A1    Jul. 6, 2023

(30) Foreign Application Priority Data

Dec. 30, 2021    (CN) .......................... 202111662904.7

(51) Int. Cl.
*G06T 17/00*     (2006.01)
*G01S 17/89*     (2020.01)

(52) U.S. Cl.
CPC ............. *G06T 17/00* (2013.01); *G01S 17/89* (2013.01); *G06T 2210/21* (2013.01)

(58) Field of Classification Search
None
See application file for complete search history.

(56) References Cited

U.S. PATENT DOCUMENTS

2019/0391270 A1*  12/2019  Uehara ................... G01S 17/04

* cited by examiner

*Primary Examiner* — Lennin R Rodriguezgonzalez
(74) *Attorney, Agent, or Firm* — BAYES PLLC

(57) ABSTRACT

An interference point determining method is provided. The method includes: obtaining a target point cloud corresponding to a highly reflective object from a target channel; obtaining a to-be-determined point cloud at the same pixel position as the target point cloud from each channel other than the target channel based on the target point cloud; based on a distance value and a reflectivity of each to-be-determined point cloud, and distance values and reflectivities respectively corresponding, to other point clouds in a neighborhood of each to-be-determined point cloud, determining whether each to-be-determined point cloud is a suspected interference point; and based on a variance between distance values of the other point clouds in the neighborhood of one to-be-determined point cloud and the one to-be-determined point cloud, or based on an interference point range determined for the one to-be-determined point cloud, determining whether the one to-be-determined point cloud is the interference point.

13 Claims, 9 Drawing Sheets

INTERFERENCE POINT DETERMINING METHOD AND APPARATUS, STORAGE MEDIUM, AND MULTI-CHANNEL LiDAR

CROSS-REFERENCE TO RELATED APPLICATION

The present application claims the benefit of priority to China Patent Application No. CN 202111662904.7, filed on Dec. 30, 2021, the content of which is incorporated herein by reference in its entirety.

TECHNICAL FIELD

This application relates to the field of LiDAR, and in particular, to an interference point determining method and apparatus, a storage medium, and a multi-channel LiDAR.

BACKGROUND

A multi-channel LiDAR can realize simultaneous scanning on multiple channels, thereby expanding a field of view while ensuring a frame rate. The multi-channel LiDAR has been widely applied to LiDAR products so far. Although emission angles of channels are different, since emitted laser beams are inevitably reflected during transmission in optical paths and return to the multiple channels of the LiDAR, each channel may receive echo signals not emitted by itself but reflected by a target object.

SUMMARY

Embodiments of this application provide an interference point determining method and apparatus, a storage medium, and multi-channel LiDAR, to solve a signal crosstalk problem in the technical field of multi-channel LiDAR and improve ranging accuracy. Technical solutions are as follows.

According to a first aspect, an embodiment of this application provides an interference point determining method, where the method includes:

obtaining a target point cloud corresponding to a highly reflective object from a target channel, where a distance between the highly reflective object and the multi-channel LiDAR is greater than or equal to a first distance threshold and is less than a second distance threshold, and reflectivity of the highly reflective object is greater than or equal to a first reflectivity threshold:

obtaining a to-be-determined point cloud at the same pixel position as the target point cloud from each channel other than the target channel based on the target point cloud;

based on a distance value and a reflectivity of each to-be-determined point cloud, and based on distance values and reflectivities respectively corresponding to other point clouds in a neighborhood of each to-be-determined point cloud, determining whether each to-be-determined point cloud is a suspected interference point; and if the to-be-determined point cloud is the suspected interference point, based on variance between distance values of the other point clouds in the neighborhood of the to-be-determined point cloud and the to-be-determined point cloud, or based on the interference point range corresponding to the to-be-determined point cloud, determining whether the to-be-determined point cloud is the interference point.

According to a second aspect, an embodiment of this application provides an interference point determining apparatus, where the apparatus includes:

a first obtaining module, configured to obtain a target point cloud corresponding to a highly reflective object from a target channel, where a distance between the highly reflective object and the multi-channel LiDAR is greater than or equal to a first distance threshold and is less than a second distance threshold, and the reflectivity of the highly reflective object is greater than or equal to a first reflectivity threshold;

a second obtaining module, configured to obtain a to-be-determined point cloud at the same pixel position as the target point cloud from each channel other than the target channel based on the target point cloud;

a suspicion determining module, configured to: based on a distance value and a reflectivity of each to-be-determined point cloud, and based on distance values and reflectivities respectively corresponding to other point clouds in a neighborhood of each to-be-determined point cloud, determine whether each to-be-determined point cloud is a suspected interference point; and an interference determining module, configured to: if the to-be-determined point cloud is the suspected interference point, based on variances between distance values of the other point clouds in the neighborhood of the to-be-determined point cloud and the to-be-determined point cloud, or based on an interference point range corresponding to the to-be-determined point cloud, determine whether the to-be-determined point cloud is the interference point.

According to a third aspect, an embodiment of this application provides a computer storage medium. The computer storage medium stores a plurality of instructions. The instructions are adapted to be loaded by a processor and execute the steps of the forgoing method.

According to a fourth aspect, an embodiment of this application provides a multi-channel LiDAR, including a processor and a memory. The memory stores a computer program. The computer program is capable of being loaded by the processor to perform the steps of the forgoing method.

The beneficial effects provided by the technical solutions of some embodiments of the present application include at least the following.

This application solves the problem in the related art that the pseudo image point cloud caused by crosstalk between channels of the multi-channel LiDAR cannot be effectively determined. A target point cloud corresponding to the highly reflective object within the preset distance range is obtained from the target channel, another to-be-determined point cloud at the same pixel position as the target point cloud is further obtained from the another channel. By using the variance between the distance values of other point clouds in the neighborhood of the to-be-determined point cloud and the to-be-determined point cloud, or using the interference point range of the to-be-determined point cloud, it is determined whether the to-be-determined point cloud is a pseudo image point cloud caused by crosstalk. In this application, the interference point in the channel can be effectively determined, to rule out the interference point and prevent the interference point from causing the LiDAR to erroneously determine a pseudo target object. In addition, in the determining method in this application, a point cloud generated by a real target object can be prevented from being erroneously determined as the interference point, which otherwise affects ranging accuracy and driving safety, thereby effectively improving the identification accuracy of the LiDAR.

BRIEF DESCRIPTION OF DRAWINGS

To explain embodiments of the present application or the technical solutions in the related art more clearly, the following briefly introduces the drawings used in the embodiments or the related art. The drawings in the following description are only some embodiments of the present application. The person skilled in the art may obtain other drawings based on these drawings without inventive labor.

DETAILED DESCRIPTION

The following clearly describes the technical solutions in the embodiments of this application with reference to the drawings in the embodiments of this application. The described embodiments are only some but not all of the embodiments of this application. All other embodiments obtained by a person of ordinary skill in the art based on the embodiments of this application without creative efforts shall fall within the protection scope of this application.

In the description of the present application, it shall be understood that the terms such as "first" and "second" are merely intended for a purpose of description, and shall not be understood as an indication or implication of relative importance. In the descriptions of this application, it should be understood that "include," "have," or any other variant thereof are intended to cover a non-exclusive inclusion unless otherwise specified and defined explicitly. For example, a process, a method, a system, a product, or a device that includes a series of steps or units is not limited to the listed steps or units, but may further include an unlisted step or unit, or may further include another inherent step or unit of the process, the method, the product, or the device. The person skilled in the art can understand specific meanings of the foregoing terms in the present application to a specific situation. In addition, in the descriptions of this application, "a plurality of" means two or more unless otherwise specified. Herein, "and/or" is an association relationship for describing associated objects and indicates that three relationships may exist. For example, A and/or B may mean the following three cases: Only A exists, both A and B exist, and only B exists. The character "/" generally indicates an "or" relationship between the associated objects.

This application is described in detail below with reference to specific embodiments.

Figure 1:
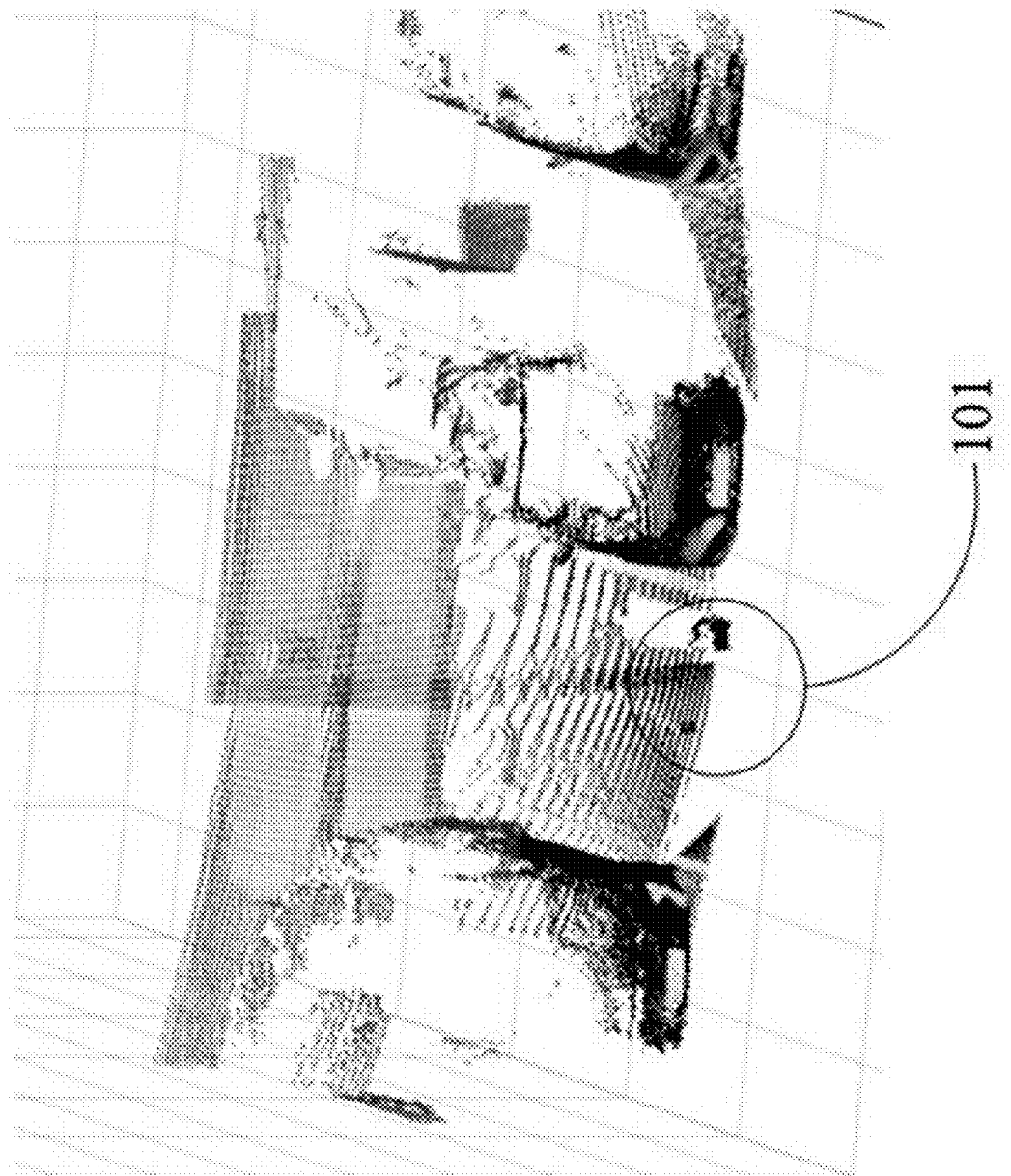
FIG. 1 is a schematic diagram of a point cloud including an interference point according to an embodiment of this application.

FIG. 1 is a schematic diagram of a point cloud including an interference point according to an embodiment of this application. The schematic diagram of the point cloud is obtained by recovering point cloud data obtained by a multi-channel LiDAR. The multi-channel LiDAR can realize simultaneous scanning with multiple channels, thereby expanding a field of view while ensuring a frame rate. Although emission angles of channels are different, since laser beam signals are inevitably reflected during transmission in optical paths and return to the multiple channels of the LiDAR, each channel may receive echo signals not emitted by itself but reflected by a target object. That is, there may be interference points in each channel, such as an interference point 101 shown in FIG. 1.

In a related art, emission coding is usually used to solve channel crosstalk. That is, a signal emitted by a laser is subjected to convolutional coding processing, and related processing is performed when laser beam echo information is received, to determine whether a laser beam echo signal is sent through a channel for receiving the laser beam echo signal. However, during near-field detection, because of the dead time of a detector of a receiving module, the channel crosstalk still cannot be solved via emission coding. Especially, when there is a highly reflective object at a close distance from the LiDAR, an echo signal in a receiving channel corresponding to the highly reflective object forms a pseudo point cloud with lower reflectivity in another channel, that is, an interference point, which affects ranging accuracy.

Figure 2:
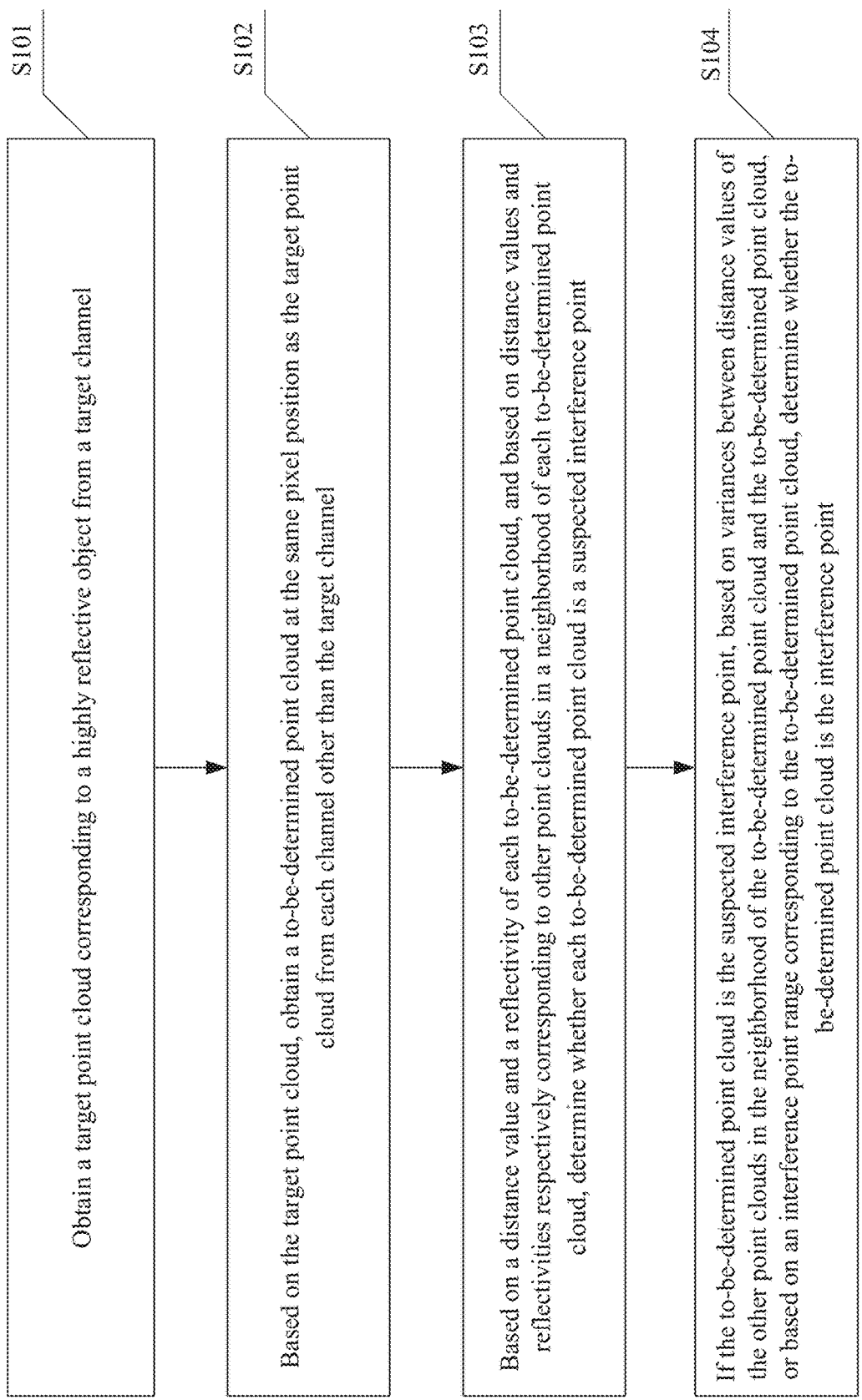
FIG. 2 is a schematic flowchart of an interference point determining method according to an embodiment of this application.

In an embodiment, as shown in FIG. 2, an interference point determining method is proposed. The method can be implemented through a computer program, which can run on an interference point determining apparatus based on a Von Neumann architecture. The computer program can be integrated into an application or run as an independent tool application.

In some embodiments, the interference point determining method includes the following steps.

S101. Obtain a target point cloud corresponding to a highly reflective object from a target channel.

The multi-channel LiDAR includes multiple channels for receiving laser beam echoes, and multiple channels of the multi-channel LiDAR include a target channel. For example, there are a total of 10 channels numbered 01 to 10, and the target channel is channel 01. In this embodiment of this application, all point clouds in all the channels are traversed, and a channel from which the target point cloud corresponding to the highly reflective object is collected is used as the target channel. This application also includes another method for determining a target channel.

A highly reflective object can be considered as an object that satisfies that a distance between the object and the multi-channel LiDAR is greater than or equal to a first distance threshold and less than a second distance threshold and that has a reflectivity greater than or equal to a first reflectivity threshold. For example, the first distance threshold is 3 meters, the second distance threshold is 8 meters, and the first reflectivity threshold is 65%. If there is a mirror in a scanning range of the target channel, a distance between the mirror and the LiDAR is 5 meters, and reflectivity is 98%, then the mirror is considered as the highly reflective object.

The multi-channel LiDAR takes an echo signal including information such as spatial position coordinates, timestamp, and echo intensity as a data point, and the data point further includes information such as distance information and angle information of a corresponding obstacle relative to the multi-channel LiDAR. A set obtained by screening points with higher energy is the point cloud, and a set of points including the foregoing multiple pieces of information is the point cloud data.

Based on the point cloud data corresponding to the point cloud, a receiver corresponding to the target channel and a data analysis module determine whether a point cloud received through the target channel is corresponding to the highly reflective object. All target point clouds corresponding to a highly reflective object are further obtained from the target channel by using a classification algorithm. For example, all 1894 target point clouds corresponding to a mirror are obtained from channel 01 used as the target channel.

S102. Based on the target point cloud, obtain a to-be-determined point cloud at the same pixel position as the target point cloud from each channel other than the target channel.

Two-dimensional coordinates (x, v) of a target point cloud t in the target channel are obtained, at least one other channel excluding the target channel is traversed, a to-be-determined point cloud at the same pixel position as the target point cloud is obtained from each one of the at least one other channel, and the number of to-be-determined point clouds is greater than 0. For example, two-dimensional coordinates of the target point cloud t in channel 01 used as the target channel are (x, y), and two-dimensional coordinates of a first to-be-determined point cloud $n_2$ that is collected from channel 02 at the same pixel position as the target point cloud t are also (x, y). Zero-valued point cloud data is collected at the same pixel position as the target point cloud in channels 03, 04, and 05. Two-dimensional coordinates of a second to-be-determined point cloud $n_6$ that is collected from channel 06 at the same pixel position as the target point cloud 1 are also (x, y), two-dimensional coordinates of a third to-be-determined point cloud $n_7$ that is collected from channel 07 at the same pixel position as the target point cloud 1 are also (x, y), two-dimensional coordinates of a fourth to-be-determined point cloud n8 that is collected from channel 08 at the same pixel position as the target point cloud 1 are also (x, y), and so on. It can be understood that the same number of point clouds are obtained from channels in the multi-channel LiDAR. For example, M×N point clouds are obtained from each channel. When diagrams of dot matrixes of point clouds are generated for the channels based on the obtained point clouds, an origin, an X-axis direction, and a Y-axis direction of the same pixel position are used as a basis.

S103. Based on a distance value and a reflectivity of each to-be-determined point cloud, and based on distance values and reflectivities respectively corresponding to other point clouds in a neighborhood of each to-be-determined point cloud, determine whether each to-be-determined point cloud is a suspected interference point.

When there is a highly reflective object in a scanning range corresponding to the target channel, an echo signal from the highly reflective object is received by the target channel to form a target point cloud, and because there is a high probability that the echo signal is received by another channel after being reflected multiple times inside the LiDAR, a pseudo image point, that is, an interference point, is formed at the same pixel position as the target point cloud in the corresponding point cloud image in the another channel. A difference between a distance value corresponding to the interference point and a distance threshold corresponding to the target point cloud is less than a preset distance threshold $T_1$, a reflectivity corresponding to the interference point is less than a reflectivity corresponding to the target point cloud, and a difference between the reflectivity corresponding to the target point cloud and the reflectivity corresponding to the interference point is greater than or equal to a preset reflectivity threshold $P_1$.

However, there is the probability that the to-be-determined point cloud at the same pixel position as the target point cloud is formed by an echo signal reflected from the real obstacle and received from a corresponding channel. If the to-be-determined point cloud does not satisfy a condition of the foregoing interference point, the to-be-determined point cloud is not a pseudo image point formed by the target point cloud in the another channel.

For example, the preset distance threshold $T_1$ is 10 mm and the preset reflectivity threshold $P_1$ is 10%. The target point cloud t (x, y) and to-be-determined point clouds $n_2$ (x, y), $n_6$ (x, y), $n_7$ (x, y), $n_8$ (x, y), and the like in other channels that are corresponding to the target point cloud are obtained. Based on a distance value and a reflectivity of each to-be-determined point cloud, it is determined whether the to-be-determined point cloud is a suspected interference point. A difference between a distance value of $n_2$ (x, y) and a distance value of the target point cloud t (x, y) is less than the preset distance threshold $T_1$, a reflectivity of $n_2$ (x, y) is less than the reflectivity of the target point cloud t (x, y), an absolute value of a difference between the reflectivity of $n_2$ (x, y) and the reflectivity of the target point cloud t (x, y) is greater than the preset reflectivity threshold P1, and therefore, it can be preliminarily determined that $n_2$ (x, y) is the suspected interference point. Similarly, $n_6$ (x, y) is preliminarily determined as the suspected interference point. An absolute value of a difference between a distance value of $n_7$ (x, y) and the distance value of the target point cloud t (x, y) is greater than the preset distance threshold $T_1$, $n_7$ (x, y) is determined as a non-suspected interference point. A reflectivity of $n_8$ (x, y) is greater than the reflectivity of the target point cloud t (x, y), so $n_8$ (x, y) is determined as the non-suspected interference point.

After the to-be-determined point cloud is preliminarily determined as the suspected interference point, based on reflectivities and distance values of other point clouds in a neighborhood of the to-be-determined point cloud that are preliminarily determined as the suspected interference point, it is further determined whether the to-be-determined point cloud is the suspected interference point.

When there is a highly reflective object in a scanning range corresponding to the target channel, an echo signal from the highly reflective object is received by the target channel to form a target point cloud, and also because of the channel crosstalk of the echo signal, a pseudo image point, that is, a point cloud range corresponding to the pseudo image point, is formed at the same pixel position as the target point cloud in the corresponding point cloud image in the another channel. Further, in the point cloud range corresponding to the pseudo image point, there is a point cloud $X_1$ satisfying that an absolute value of a difference between a distance value of the point cloud $X_1$ and the distance value of the target point cloud is less than a preset distance threshold $T_2$, and the number of point clouds $X_1$ should be greater than or equal to a statistical threshold $M_1$. In an interference point zone, there is a point cloud $X_2$ whose reflectivity is less than a preset reflectivity threshold $P_2$, and the number of point clouds $X_2$ should be greater than or equal to a statistical threshold $M_2$. When the reflectivities and distance values of the other point clouds in the neighborhood of the to-be-determined point cloud that is preliminarily determined as the suspected interference point satisfy a condition corresponding to the point cloud range corresponding to the foregoing pseudo image point, the to-be-determined point cloud is determined as the suspected interference point. It can be understood that the preset reflectivity threshold $P_2$ is obtained based on the reflectivity corresponding to the target point cloud and the foregoing preset reflectivity threshold $P_1$. For example, the preset reflectivity threshold $P_2$ is obtained by subtracting the preset reflectivity threshold $P_1$ from the reflectivity corresponding to the target point cloud.

In some embodiments, it is preliminarily determined that to-be-determined point clouds $n_2$ (x, y) and $n_6$ (x, y) are suspected interference points in a second channel and a sixth channel, respectively. A point cloud $X_3$ satisfying that an absolute value of a difference between a distance value of the point cloud $X_3$ in a neighborhood of the to-be-determined point cloud $n_2$ (x, y) and a distance value of the to-be-determined point cloud $n_2$ (x, y) is less than a preset distance threshold $T_3$ is obtained, and a point cloud $X_4$ whose reflectivity is less than a preset reflectivity threshold $P_2$ is obtained. A neighborhood range is a range that is centered on the to-be-determined point cloud and that has a length of $L_1$ pixels and a width of $L_2$ pixels. In some embodiments, $L_1$ and $L_2$ are the same value, and/or the preset distance threshold $L_3$ and the preset distance threshold $L_2$ are the same value. It is determined that the number of point clouds $X_3$ is greater than a first statistical threshold, the number of point clouds $X_4$ is greater than a statistical threshold $M_2$ or a ratio of the number of point cloud $X_3$ to the number of all point clouds in the neighborhood of $n_2$ (x, y) is greater than a statistical threshold $M_3$, a ratio of the number of point clouds $X_4$ to the number of all point clouds in the neighborhood of $n_2$ (x, y) is greater than a statistical threshold $M_4$, and therefore, $n_2$ (x, y) is determined as the suspected interference point. Based on the same process, a point cloud $X_5$ satisfying that an absolute value of a difference between a distance value of the point cloud $X_5$ in a neighborhood of $n_6$ (x, y) and a distance value of the to-be-determined point cloud no (x, y) is less than the preset distance threshold $T_3$ is obtained, a point cloud $X_6$ whose reflectivity is less than the preset reflectivity threshold $P_2$ is obtained, the number of point clouds $X_5$ is less than a statistical threshold $M_1$, and therefore, $n_6$ (x, y) is determined as the non-suspected interference point.

S104. If the to-be-determined point cloud is the suspected interference point, based on a variance between distance values of the other point clouds in the neighborhood of the to-be-determined point cloud and the to-be-determined point cloud, or based on an interference point range determined by the to-be-determined point cloud, determine whether the to-be-determined point cloud is the interference point.

In some embodiments, based on the variance between the distance values of the other point clouds in the neighborhood of the to-be-determined point cloud and the to-be-determined point cloud, a method of determining whether the to-be-determined point cloud is the interference point is as follows.

When it is determined that the to-be-determined point cloud is the suspected interference point, the differences between the distance values of all the point clouds in the neighborhood of the to-be-determined point cloud and the to-be-determined point cloud are obtained, the variance of the distance values is further obtained based on the plurality of the differences between the distance values, and a point cloud $X_3$ satisfying that the absolute value of the difference between the distance value of the point cloud $X_3$ in the neighborhood and the distance value of the to-be-determined point cloud is less than the preset distance threshold $T_3$ is obtained. When the variance of the distance values is less than the variance threshold and the number of point clouds $X_3$ is greater than or equal to the statistical threshold $M_5$, this indicates that the to-be-determined point cloud is generated by the echo signal received by the channel from the real obstacle, and is not the pseudo image point formed by the highly reflective object in the channel. In other words, when the variance between the distance values of the other point clouds in the neighborhood of the to-be-determined point cloud and the to-be-determined point cloud is greater than or equal to a variance threshold, or the number of point clouds $X_3$ is less than a statistical threshold $M_5$, it is determined that the to-be-determined point cloud is the interference point.

For example, the to-be-determined point cloud $n_2$ (x, y) in the second channel determined as the suspected interference point, and absolute values $t_1, t_2, t_3, \ldots, T_z$ of differences between the distance values of each point cloud included in a neighborhood of m (x, y) and $n_2$ (x, y) are obtained, the variance of distance values is calculated based on the absolute values of the differences between the distance values, and in this case, the variance of the distance values is greater than the variance threshold. A point cloud $X_3$ satisfying that an absolute value of a difference between the distance value of the point cloud $X_3$ in the neighborhood and the to-be-determined point cloud $n_2$ (x, y) is less than the preset distance threshold $T_3$ is obtained. Even if the number of point clouds $X_3$ is greater than the statistical threshold $M_5$, the to-be-determined point cloud is still determined as the interference point.

In another embodiment of this application, based on the interference point range determined via the to-be-determined point cloud, it is determined whether the to-be-determined point cloud is the interference point. For example, based on the interference point range determined via the to-be-determined point cloud, a method of determining whether the to-be-determined point cloud is the interference point is as follows.

When the to-be-determined point cloud is determined as the suspected interference point, based on the distance value of the to-be-determined point cloud, another point cloud, originated from the same obstacle as the to-be-determined point cloud, in the channel corresponding to the to-be-determined point cloud is determined, a point cloud range is further obtained based on the foregoing another point cloud, and the point cloud range is defined as the interference point range of the to-be-determined point cloud. When there is a highly reflective object in a scanning range of the target channel, there is a target point cloud corresponding to the highly reflective object in a point cloud image of the target channel, this target point cloud forms a pseudo image point in another channel, and a point cloud range corresponding to the pseudo image point is further formed. When the to-be-determined point cloud is the interference point formed by the target point cloud, the point cloud range corresponding to the pseudo image point includes the interference point range of the to-be-determined point cloud.

For example, a point cloud $X_7$ belonging to the same obstacle as the to-be-determined point cloud $n_2$ (x, y) is determined from the second channel, and the interference point range of $n_2$ (x, y) is determined based on the point cloud $X_7$. A point cloud range corresponding to the highly reflective object is obtained from the first channel, and a highly reflective point cloud range mapped at the same pixel position in the second channel by the point cloud range corresponding to the highly reflective object is obtained. When the interference point range of $n_2$ (x, y) is included in the foregoing highly reflective point cloud range, the to-be-determined point cloud $n_2$ (x, y) is determined as the interference point.

This application solves the problem in the related art that the pseudo image point cloud caused by crosstalk between channels of the multi-channel LiDAR cannot be effectively determined. A target point cloud corresponding to the highly reflective object within the preset distance range is obtained from the target channel, another to-be-determined point cloud at the same pixel position as the target point cloud is further obtained from the another channel. By using the variance between the distance values of other point clouds in the neighborhood of the to-be-determined point cloud and the to-be-determined point cloud, or using the interference point range of the to-be-determined point cloud, it is determined whether the to-be-determined point cloud is a pseudo image point cloud caused by crosstalk. In this application, the interference point in the channel can be effectively determined, to rule out the interference point and prevent the interference point from causing the LiDAR to erroneously determine a pseudo target object. In addition, in the determining method in this application, a point cloud generated by a real target object can be prevented from being erroneously determined as the interference point, which otherwise affects ranging accuracy and driving safety, thereby effectively improving the identification accuracy of the LiDAR.

Figure 3:
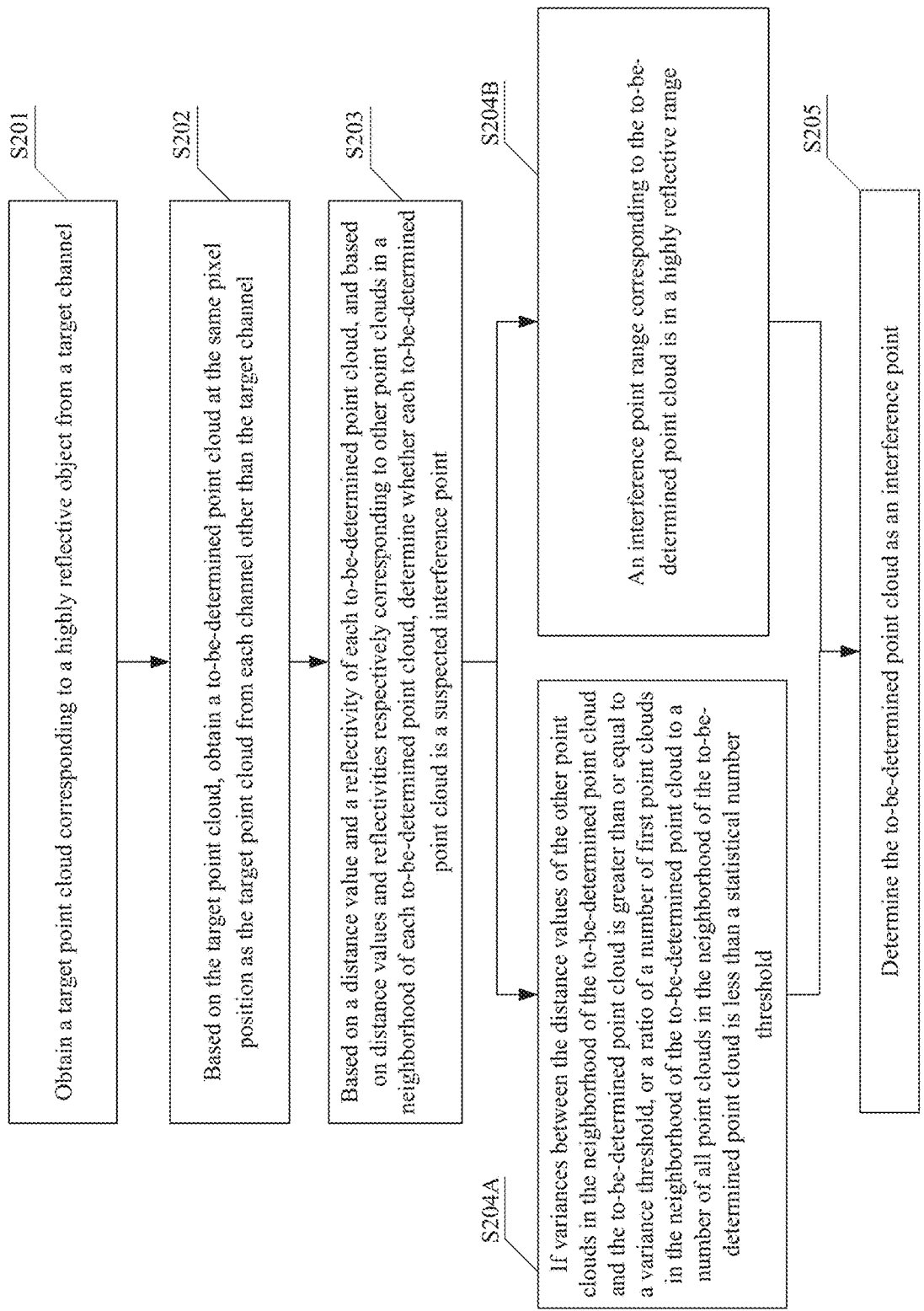
FIG. 3 is a schematic flowchart of another interference point determining method according to an embodiment of this application.

As shown in FIG. 3, an interference point determining method is proposed. The method can be implemented through a computer program, which can run on an interference point determining apparatus based on a Von Neumann architecture. The computer program can be integrated into an application or run as an independent tool application.

In some embodiments, the interference point determining method includes the following steps.

S201. Obtain a target point cloud corresponding, to a highly reflective object from a target channel.

A highly reflective object can be considered as an object that satisfies that a distance between the object and the multi-channel LiDAR is greater than or equal to a first distance threshold and less than a second distance threshold and that has a reflectivity greater than or equal to a first reflectivity threshold.

For step S201, refer to the foregoing step S101, Details are not described herein again.

S202. Based on the target point cloud, obtain a to-be-determined point cloud at the same pixel position as the target point cloud from each channel other than the target channel.

For step S202, refer to the foregoing step S102. Details are not described herein again.

S203. Based on a distance value and a reflectivity of each to-be-determined point cloud, and based on distance values and reflectivities respectively corresponding to other point clouds in a neighborhood of each to-be-determined point cloud, determine whether each to-be-determined point cloud is a suspected interference point.

For step S203, refer to the foregoing step S103. Details are not described herein again.

S204A. If the variance between the distance values of the other point clouds in the neighborhood of the to-be-determined point cloud and the to-be-determined point cloud is greater than or equal to a variance threshold, or a ratio of the number of first point clouds in the neighborhood of the to-be-determined point cloud to the number of all point clouds in the neighborhood of the to-be-determined point cloud is less than a statistical number threshold.

The first point cloud is a point cloud satisfying that an absolute value of a difference between a distance value of the point cloud in the neighborhood of the to-be-determined point cloud and the distance value of the to-be-determined point cloud is less than a third distance threshold.

When it is determined that the to-be-determined point cloud is the suspected interference point, based on the variance between distance values of the other point clouds in the neighborhood of the to-be-determined point cloud and the to-be-determined point cloud, it is determined whether the to-be-determined point cloud is the interference point.

In some embodiments, when it is determined that the to-be-determined point cloud is the suspected interference point, the differences between the distance values of all point clouds in the neighborhood of the to-be-determined point cloud and the to-be-determined point cloud are obtained, the variance of the distance values is further obtained based on the plurality of the differences between the distance values, and a first point cloud satisfying that the absolute value of the difference between the distance value of the first point cloud in the neighborhood and the distance value of the to-be-determined point cloud is less than the third distance threshold. When the variance of the distance values is less than the variance threshold and the number of first point clouds is greater than or equal to the statistical number threshold, this indicates that the to-be-determined point cloud is generated by the echo signal received by the channel from the real obstacle, and is not the pseudo image point formed by the highly reflective object in the channel. In other words, when the variance between the distance values of the other point clouds in the neighborhood of the to-be-determined point cloud and the to-be-determined point cloud is greater than or equal to a variance threshold, or a ratio of the number of first point clouds to the number of all point clouds in the neighborhood of the to-be-determined point cloud is less than a statistical number threshold, it is determined that the to-be-determined point cloud is the interference point.

In an embodiment, the method further includes: obtaining zero-valued point cloud data in the neighborhood of the to-be-determined point cloud, where the zero-valued point cloud data includes the number of zero-valued point clouds in the to-be-determined point cloud. When the variance between the distance values of the other point clouds in the neighborhood of the to-be-determined point cloud and the to-be-determined point cloud is greater than or equal to a variance threshold, or a ratio of the number of first point clouds to the number of all point clouds in the neighborhood of the to-be-determined point cloud is less than a statistical number threshold minus a ratio of the number of zero-valued point clouds to the number of all point clouds in the neighborhood of the to-be-determined point cloud, it is determined that the to-be-determined point cloud is the interference point.

In this embodiment of this application, when the ratio of the number of first point clouds to the number of all the point clouds in the neighborhood of the to-be-determined point cloud is compared with the statistical number threshold, an amount of null data in the neighborhood is introduced, to avoid excessive null data in the neighborhood, which otherwise affects the calculation of the ratio of the number of first point clouds to the number of all the point clouds in the neighborhood of the to-be-determined point cloud, and further affects the determination of whether the to-be-determined point cloud is the interference point.

S204B. The interference point range corresponding to the to-be-determined point cloud is in a highly reflective range.

When the to-be-determined point cloud is determined as the suspected interference point, based on the distance value of the to-be-determined point cloud, another point cloud, originated from the same obstacle as the to-be-determined point cloud, in the channel corresponding to the to-be-determined point cloud is determined, a point cloud range is further obtained based on the foregoing another point cloud, and the point cloud range is defined as the interference point range of the to-be-determined point cloud. When there is a highly reflective object in a scanning range of the target channel, there is a target point cloud corresponding to the highly reflective object in a point cloud image of the target channel, this target point cloud forms a pseudo image point in another channel, and a point cloud range corresponding to the pseudo image point is further formed. When the to-be-determined point cloud is the interference point formed by the target point cloud, the point cloud range corresponding to the pseudo image point includes the interference point range of the to-be-determined point cloud.

S205. Determine the to-be-determined point cloud as an interference point.

When step S204A or step S204B is satisfied, the to-be-determined point cloud is determined as the interference point.

Figure 4:
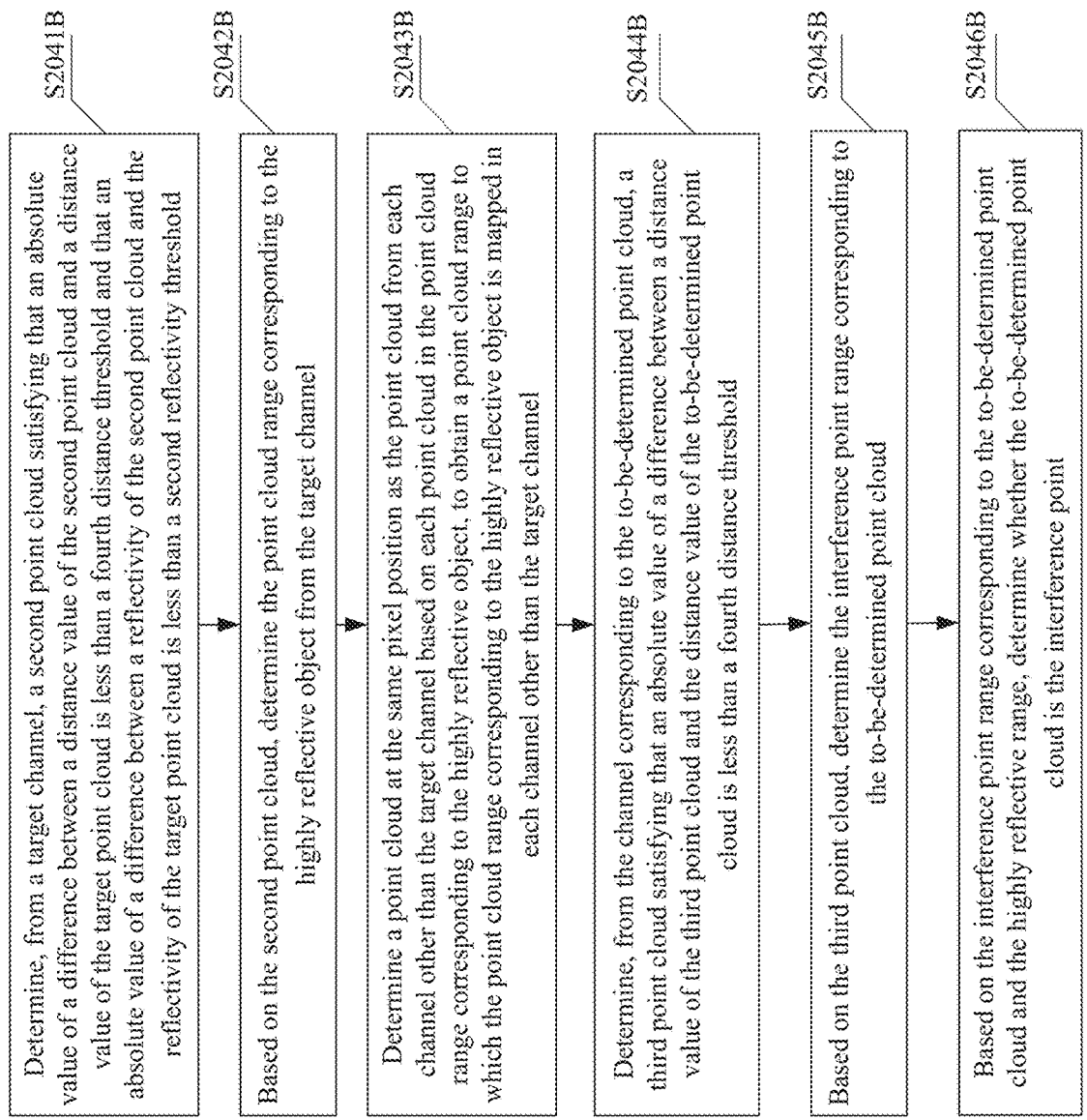
FIG. 4 is a schematic flowchart of determining whether a suspected interference point is an interference point according to an embodiment of this application.

FIG. 4 is a schematic flowchart of determining whether a suspected interference point is an interference point according to an embodiment of this application. The method is an exemplary implementation method for determining whether the suspected interference point is the interference point based on the principle of S204B.

In some embodiments, the method includes steps as follows.

S2041B. Determine, from a target channel, a second point cloud satisfying that an absolute value of a difference between a distance value of the second point cloud and a distance value of the target point cloud is less than a fourth distance threshold and that an absolute value of a difference between a reflectivity of the second point cloud and the reflectivity of the target point cloud is less than a second reflectivity threshold.

Figure 5:
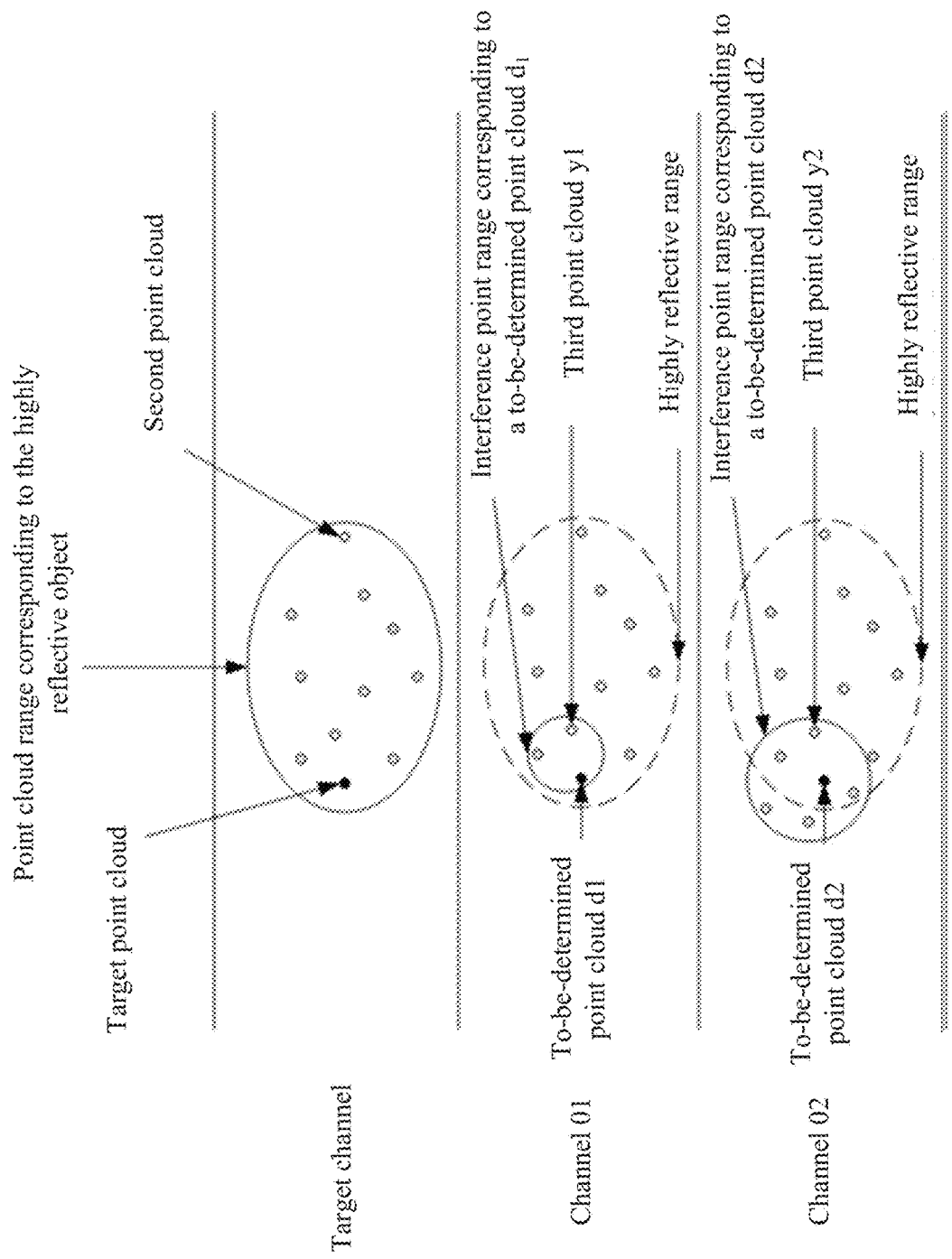
FIG. 5 is a schematic diagram of a dot matrix for determining whether a suspected interference point is an interference point according to an embodiment of this application.

FIG. 5 is a schematic diagram of a dot matrix for determining whether a suspected interference point is an interference point according to an embodiment of this application. The schematic diagram of the dot matrix includes: a target channel, channel 01, channel 02, channel 03, and the like (not shown in the figure). The target channel is corresponding to the target point cloud collected by using the highly reflective object, channel 01 is corresponding to the to-be-determined point cloud $d_1$ at the same pixel position as the target point cloud in channel 01, and the to-be-determined point cloud $d_1$ is determined as the suspected interference point after S203. Channel 02 is corresponding to the to-be-determined point cloud $d_2$ at the same pixel position as the target point cloud in channel 02, and the to-be-determined point cloud $d_2$ is determined as the suspected interference point after S203.

The second point cloud satisfying that the absolute value of the difference between the distance value of the second point cloud and the distance value of the target point cloud is less than the fourth distance threshold and that the absolute value of the difference between the reflectivity of the second point cloud and the reflectivity of the target point cloud is less than the second reflectivity threshold is determined from all point clouds collected from the target channel. In other words, the second point cloud is the point cloud, collected from the target channel, corresponding to the highly reflective object.

S2042B. Based on the second point cloud, determine the point cloud range corresponding to the highly reflective object from the target channel.

As shown in FIG. 5, based on the second point cloud included in all the point clouds collected from the target channel, the point cloud range corresponding to the highly reflective object is determined.

S2043B. Determine a point cloud at the same pixel position as the point cloud from each channel other than the target channel based on each point cloud in the point cloud range corresponding to the highly reflective object, to obtain a point cloud range to which the point cloud range corresponding to the highly reflective object is mapped in each channel other than the target channel.

As shown in FIG. 5, the point cloud range corresponding to the highly reflective object in the target channel is obtained, and a highly reflective range to which the point cloud range corresponding to the highly reflective object is mapped is determined in the diagram of a dot matrix of point clouds including the point cloud data collected from the channel 01. A highly reflective range to which the point cloud range corresponding to the highly reflective object is mapped is determined in the diagram of a dot matrix of point clouds including the point cloud data collected from the channel 02.

S2044B. Determine, from the channel corresponding to the to-be-determined point cloud, a third point cloud satisfying that an absolute value of a difference between a distance value of the third point cloud and the distance value of the to-be-determined point cloud is less than a fourth distance threshold.

The third point cloud in the channel corresponding to the to-be-determined point cloud is determined based on the distance value. In other words, the point cloud data collected from the channel corresponding to the to-be-determined point cloud based on the distance value may include a point cloud, that is, the third point cloud, originated from the same obstacle as the to-be-determined point cloud.

As shown in FIG. 5, a third point cloud $y_1$ satisfying that an absolute value of a difference between a distance value of the third point cloud $y_1$ and the distance value of the to-be-determined point cloud $d_1$ is less than a fourth distance threshold is obtained from all the point cloud data collected from the channel 01; and a third point cloud $y_2$ satisfying that an absolute value of a difference between a distance value of the third point cloud $y_2$ and the distance value of the to-be-determined point cloud $d_2$ is less than the fourth distance threshold is obtained from all the point cloud data collected from the channel 02.

S2045B. Based on the third point cloud, determine the interference point range corresponding to the to-be-determined point cloud.

As shown in FIG. 5, the interference point range corresponding to the to-be-determined point cloud $d_1$ is determined based on the third point cloud $y_1$ corresponding to the channel 01; and the interference point range corresponding to the to-be-determined point cloud $d_2$ is determined based on the third point cloud $y_2$ corresponding to the channel 02.

S2046B. Based on the interference point range corresponding to the to-be-determined point cloud and the highly reflective range, determine whether the to-be-determined point cloud is the interference point.

It is determined whether the interference point range corresponding to the to-be-determined point cloud is in the highly reflective range. If the interference point range corresponding to the to-be-determined point cloud is in the highly reflective range, the to-be-determined point cloud is determined as the interference point; or if the interference point range corresponding to the to-be-determined point cloud is not in the highly reflective range, the to-be-determined point cloud is determined as a non-interference point.

As shown in FIG. 5, the interference point range corresponding to the to-be-determined point cloud $d_1$ corresponding to channel 01 is in the highly reflective range, and the to-be-determined point cloud $d_1$ is determined as the interference point. The interference point range corresponding to the to-be-determined point cloud $d_2$ corresponding to channel 02 is not completely in the highly reflective range, and therefore, the to-be-determined point cloud $d_2$ may be generated by the echo signal collected by channel 02 from the real obstacle, and is not a pseudo image interference point generated by the target point cloud in the channel 02.

The interference point determining method provided in the embodiments of this application has high reliability, a small amount of calculation, and high calculation efficiency, and can be effectively used to determine a pseudo image interference point corresponding to a target point cloud in another channel.

This application solves the problem in the related art that the pseudo image point cloud caused by crosstalk between channels of the multi-channel LiDAR cannot be effectively determined. A target point cloud corresponding to the highly reflective object within the preset distance range is obtained from the target channel, another to-be-determined point cloud at the same pixel position as the target point cloud is further obtained from another channel. By using the variance between the distance values of other point clouds in the neighborhood of the to-be-determined point cloud and the to-be-determined point cloud, or using the interference point range of the to-be-determined point cloud, it is determined whether the to-be-determined point cloud is a pseudo image point cloud caused by crosstalk. In this application, the interference point in the channel can be effectively determined, to rule out the interference point and prevent the interference point from causing the LiDAR to erroneously determine a pseudo target object. In addition, in the determining method in this application, a point cloud generated by a real target object can be prevented from being erroneously determined as the interference point, which otherwise affects ranging accuracy and driving safety, thereby effectively improving the identification accuracy of the LiDAR.

Figure 6:
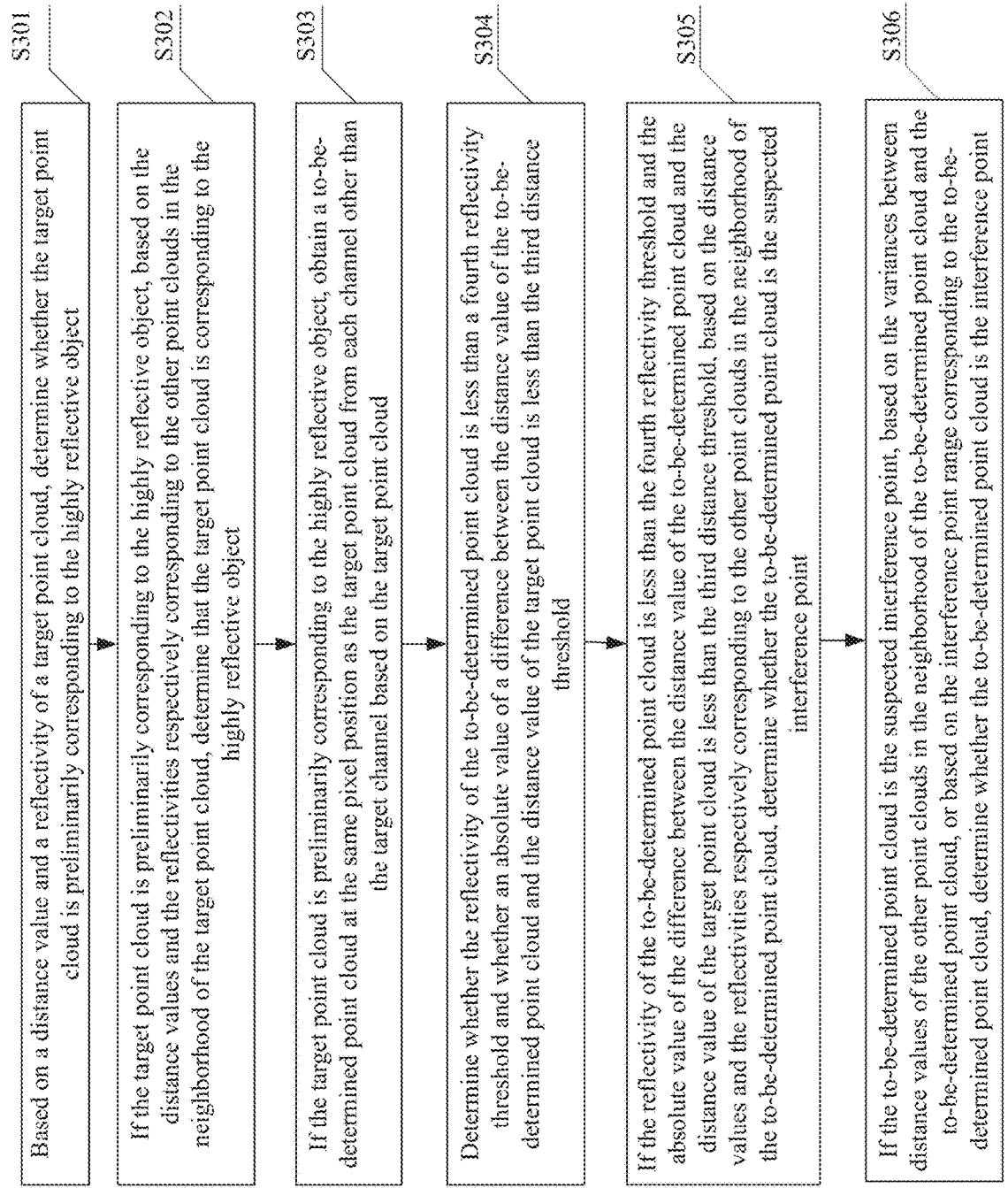
FIG. 6 is a schematic flowchart of an interference point determining method according to an embodiment of this application.

As shown in FIG. 6, an interference point determining method is proposed. The method can be implemented through a computer program, which can run on an interference point determining apparatus based on a Von Neumann architecture. The computer program can be integrated into an application or run as an independent tool application.

S301. Based on a distance value and a reflectivity of a target point cloud, determine whether the target point cloud is preliminarily corresponding to the highly reflective object.

A highly reflective object can be considered as an object that satisfies that a distance between the object and the multi-channel LiDAR is greater than or equal to a first distance threshold and less than a second distance threshold and that has a reflectivity greater than or equal to a first reflectivity threshold. In this embodiment of this application, by using the point cloud that is corresponding to each channel respectively and that is collected by the multi-channel LiDAR, based on the distance value and the reflectivity of each point cloud, it is determined whether the point cloud is corresponding to the highly reflective object.

In an embodiment, based on a distance value and a reflectivity of a target point cloud, a method for determining whether the target point cloud is preliminarily corresponding to the highly reflective object includes: obtaining a distance value and a reflectivity of the target point cloud; and if the distance value of the target point cloud is less than a second distance threshold and greater than or equal to a first distance threshold, and the reflectivity of the target point cloud is greater than or equal to a first reflectivity threshold, determining that the target point cloud is preliminarily corresponding to the highly reflective object.

S302. If the target point cloud is preliminarily corresponding to the highly reflective object, based on the distance values and the reflectivities respectively corresponding to the other point clouds in the neighborhood of the target point cloud, determine whether the target point cloud is corresponding to the highly reflective object.

If the target point cloud is preliminarily corresponding to the highly reflective object, based on the distance values and the reflectivities respectively corresponding to the other point clouds in the neighborhood of the target point cloud, it is further determined whether the target point cloud is corresponding to the highly reflective object. The neighborhood of the target point cloud can be understood as a range that centers on the target point cloud and that has a length of $L_3$ pixels and a width of $L_4$ pixels, where in some embodiments, $L_3$ and $L_4$ are the same value, and/or length and width of the neighborhood of the to-be-determined point cloud are the same value.

In an embodiment, based on the distance values and the reflectivities respectively corresponding to the other point clouds in the neighborhood of the target point cloud, a method for determining that the target point cloud is corresponding to the highly reflective object includes:

determining, from the neighborhood of the target point cloud, a fourth point cloud satisfying that an absolute value of a difference between a distance value of the fourth point cloud and the distance value of the target point cloud is less than a fifth distance threshold, and determining a fifth point cloud whose reflectivity is greater than or equal to a third reflectivity threshold, where the number of fourth point clouds and the number of fifth point clouds are respectively greater than or equal to 0; and if a ratio of the number of fourth point clouds to the number of all point clouds in the neighborhood corresponding to the target point cloud is greater than or equal to a first statistical distance threshold, and a ratio of the number of fifth point clouds to the number of all the point clouds in the neighborhood corresponding to the target point cloud is greater than or equal to a first statistical reflectivity threshold, determining that the target point cloud is corresponding to the highly reflective object.

Figure 7:
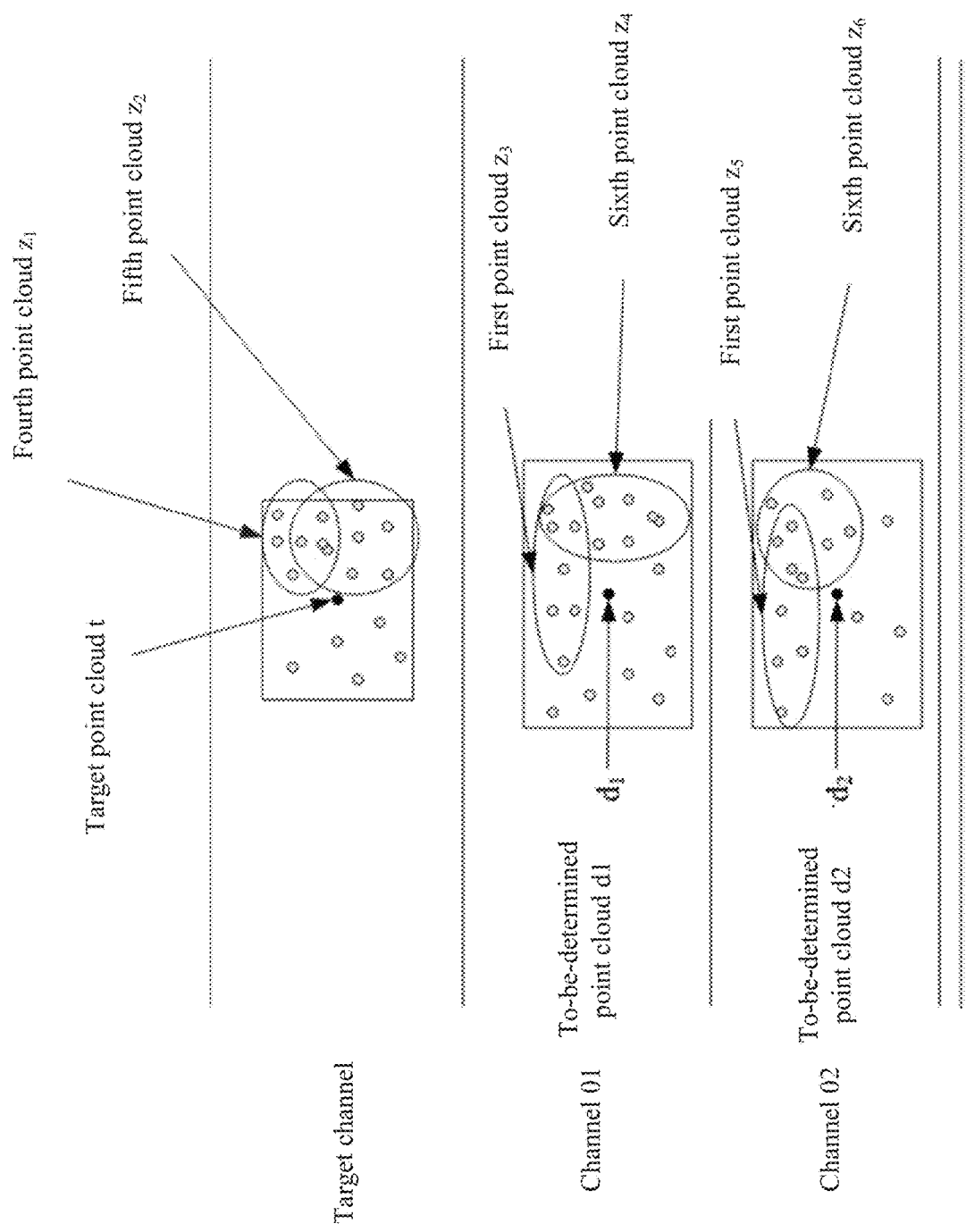
FIG. 7 is a diagram of a dot matrix of point clouds including a target point cloud and a to-be-determined point cloud according to an embodiment of this application.

FIG. 7 is a diagram of a dot matrix of point clouds including a target point cloud and a to-be-determined point cloud according to an embodiment of this application. The diagram of a dot matrix of point clouds includes: a target point cloud t obtained by a target channel, a to-be-determined point cloud d1 obtained by channel 01, a to-be-determined point cloud $d_2$ obtained by channel 02, a to-bedetermined point cloud $d_3$ obtained by channel 03 (not shown in the figure), and the like.

For example, distance values and reflectivities respectively corresponding to all point clouds in a neighborhood of the target point cloud t are obtained, and a fourth point cloud $z_1$ satisfying that an absolute value of a difference between a distance value of the fourth point cloud $z_1$ and a distance value of the target point cloud t is less than a fifth distance threshold is obtained, and a fifth point cloud $z_2$ whose reflectivity is greater than or equal to the third reflectivity threshold is obtained. If a ratio of the number of fourth point clouds $z_1$ to the number of all the point clouds in the neighborhood corresponding to the target point cloud is greater than or equal to a first statistical distance threshold, and a ratio of the number of fifth point clouds $z_2$ to the number of all the point clouds in the neighborhood corresponding to the target point cloud is greater than or equal to a first statistical reflectivity threshold, it is determined that the target point cloud t is corresponding to the highly reflective object.

In this embodiment of this application, by using the distance value and the reflectivity of the target point cloud, it is determined whether the target point cloud is corresponding to the highly reflective object. The method for determining the target point cloud has high reliability, a small amount of calculation, and high calculation efficiency, and can be effectively used to determine a target point cloud corresponding to the highly reflective object in another channel, thereby obtaining the to-be-determined point cloud corresponding to the another channel other than the target channel.

In an embodiment, the method further includes: obtaining zero-valued point cloud data in the neighborhood of the target point cloud, where the zero-valued point cloud data includes the number of zero-valued point clouds in the target point cloud. When a ratio of the number of fourth point clouds to the number of all point clouds in the neighborhood corresponding to the target point cloud is greater than or equal to a first statistical distance threshold minus a ratio of the number of zero-valued point clouds to the number of all the point clouds in the neighborhood corresponding to the target point cloud, and a ratio of the number of fifth point clouds to the number of all the point clouds in the neighborhood corresponding to the target point cloud is greater than or equal to a first statistical reflectivity threshold minus a ratio of the number of zero-valued point clouds to the number of all the point clouds in the neighborhood corresponding to the target point cloud, it is determined that the target point cloud is corresponding to the highly reflective object.

In another embodiment, the method further includes: based on distance values respectively corresponding to multiple target point clouds, determining whether the multiple target point clouds are corresponding to the same highly reflective object, and sorting target point clouds respectively corresponding to highly reflective objects.

S303. If the target point cloud is preliminarily corresponding to the highly reflective object, obtain a to-be-determined point cloud at the same pixel position as the target point cloud from each channel other than the target channel based on the target point cloud.

For step S303, refer to the foregoing step S102. Details are not described herein again.

S304. Determine whether the reflectivity of the to-be-determined point cloud is less than a fourth reflectivity threshold and whether an absolute value of a difference between the distance value of the to-be-determined point cloud and the distance value of the target point cloud is less than the third distance threshold.

Based on whether the reflectivity of the to-be-determined point cloud is less than a fourth reflectivity threshold and whether an absolute value of a difference between the distance value of the to-be-determined point cloud and the distance value of the target point cloud is less than the third distance threshold, it is determined whether the to-be-determined point cloud is corresponding to the target point cloud. In other words, it is determined whether the to-be-determined point cloud existing at the same pixel position as the target point cloud in the another channel is formed by the echo signal received by the corresponding channel from the real obstacle. If the to-be-determined point cloud does not satisfy the foregoing condition, the to-be-determined point cloud is not a pseudo image point formed by the target point cloud in the another channel.

For example, as shown in FIG. 7, it is separately determined whether the reflectivity of the to-be-determined point cloud $d_1$ and the to-be-determined point cloud $d_2$ is less than a fourth reflectivity threshold, and it is separately determined whether an absolute value of a difference between a distance value of the to-be-determined point cloud $d_1$ and the distance value of the target point cloud t is less than the third distance threshold, and whether an absolute value of a difference between a distance value of the to-be-determined point cloud $d_2$ and the distance value of the target point cloud t is less than the third distance threshold.

S305. If the reflectivity of the to-be-determined point cloud is less than the fourth reflectivity threshold and the absolute value of the difference between the distance value of the to-be-determined point cloud and the distance value of the target point cloud is less than the third distance threshold, based on the distance values and the reflectivities respectively corresponding to the other point clouds in the neighborhood of the to-be-determined point cloud, determine whether the to-be-determined point cloud is the suspected interference point.

If the reflectivity of the to-be-determined point cloud is less than the fourth reflectivity threshold, and the absolute value of the difference between the distance value of the to-be-determined point cloud and the distance value of the target point cloud is less than the third distance threshold, the target point cloud corresponding to the to-be-determined point cloud is preliminarily determined. Based on the distance values and the reflectivities respectively corresponding to the other point clouds in the neighborhood of the to-be-determined point cloud, it is further determined whether the to-be-determined point cloud is the suspected interference point.

In an embodiment, a method for determining whether the to-be-determined point cloud is the suspected interference point includes:

determining, from the neighborhood of the to-be-determined point cloud, a first point cloud satisfying that an absolute value of a difference between a distance value of the first point cloud and the distance value of the to-be-determined point cloud is less than the third distance threshold, and determining a sixth point cloud whose reflectivity is less than the fourth reflectivity threshold, where the number of first point clouds and the number of sixth point clouds are respectively greater than or equal to 0; and if the number of first point clouds is greater than or equal to the second statistical distance threshold, and a ratio of the number of sixth point clouds to the number of all the point clouds in the neighborhood corresponding to the to-be-determined point cloud is greater than or equal to the second statistical reflectivity threshold, determining the to-be-determined point cloud as the suspected interference point.

For example, as shown in FIG. 7, a first point cloud $z_3$ satisfying that an absolute value of a difference between a distance value of the first point cloud $z_3$ and the distance value of the to-be-determined point cloud is less than the third distance threshold is obtained from the neighborhood of the to-be-determined point cloud $d_1$, and a sixth point cloud $z_4$ Whose reflectivity is less than the fourth reflectivity threshold is obtained from the neighborhood of the to-be-determined point cloud $d_1$. It is determined that the number of first point clouds $z_3$ is greater than a second statistical distance threshold, and a ratio of the number of sixth point clouds $z_4$ to the number of all point clouds in the neighborhood corresponding to the to-be-determined point cloud $d_1$ is greater than the second statistical reflectivity threshold, therefore it is determined that the to-be-determined point cloud $d_1$ is a suspected interference point. A first point cloud $z_5$ satisfying that an absolute value of a difference between a distance value of the first point cloud $z_5$ and the distance value of the to-be-determined point cloud is less than the third distance threshold is obtained from the neighborhood of the to-be-determined point cloud $d_2$, and a sixth point cloud $z_6$ whose reflectivity is less than the fourth reflectivity threshold is obtained from the neighborhood of the to-be-determined point cloud $d_2$. It is determined that the number of first point clouds $z_5$ is less than a second statistical distance threshold. Even if a ratio of the number of the sixth point cloud $z_6$ and the number of all point clouds in the neighborhood corresponding to the to-be-determined point cloud $d_2$ is greater than the second statistical reflectivity threshold, it is determined that the to-be-determined point cloud $d_2$ is a non-suspected interference point.

In an embodiment, the method further includes: obtaining zero-valued point cloud data in the neighborhood of the to-be-determined point cloud, where the zero-valued point cloud data includes the number of zero-valued point clouds in the target point cloud. If the number of first point clouds is greater than or equal to the second statistical distance threshold minus a ratio of the number of zero-valued point clouds to the number of all the point clouds in the neighborhood of the to-be-determined point cloud, and a ratio of the number of sixth point clouds to the number of all the point clouds in the neighborhood corresponding to the to-be-determined point cloud is greater than or equal to the second statistical reflectivity threshold minus a ratio of the number of zero-valued point clouds to the number of all the point clouds in the neighborhood of the to-be-determined point cloud, the to-be-determined point cloud is determined as the suspected interference point.

S306. If the to-be-determined point cloud is the suspected interference point, based on the variance between distance values of the other point clouds in the neighborhood of the to-be-determined point cloud and the to-be-determined point cloud, or based on an interference point range determined by the to-be-determined point cloud, determine whether the to-be-determined point cloud is the interference point.

For step S306, refer to the foregoing step S104. Details are not described herein again.

This application solves the problem in the related art that the pseudo image point cloud caused by crosstalk between channels of the multi-channel LiDAR cannot be effectively determined. A target point cloud corresponding to the highly reflective object within the preset distance range is obtained from the target channel, another to-be-determined point cloud at the same pixel position as the target point cloud is further obtained from the another channel. By using the variance between the distance values of other point clouds in the neighborhood of the to-be-determined point cloud and the to-be-determined point cloud, or using the interference point range of the to-be-determined point cloud, it is determined whether the to-be-determined point cloud is a pseudo image point cloud caused by crosstalk. In this application, the interference point in the channel can be effectively determined, to rule out the interference point and prevent the interference point from causing the LiDAR to erroneously determine a pseudo target object. In addition, in the determining method in this application, a point cloud generated by a real target object can be prevented from being erroneously determined as the interference point, which otherwise affects ranging accuracy and driving safety, thereby effectively improving the identification accuracy of the LiDAR.

A device embodiment of this application is provided below, and can be used to perform the method embodiments of this application. For details not disclosed in this device embodiment of this application, refer to the method embodiments of this application.

Figure 8:
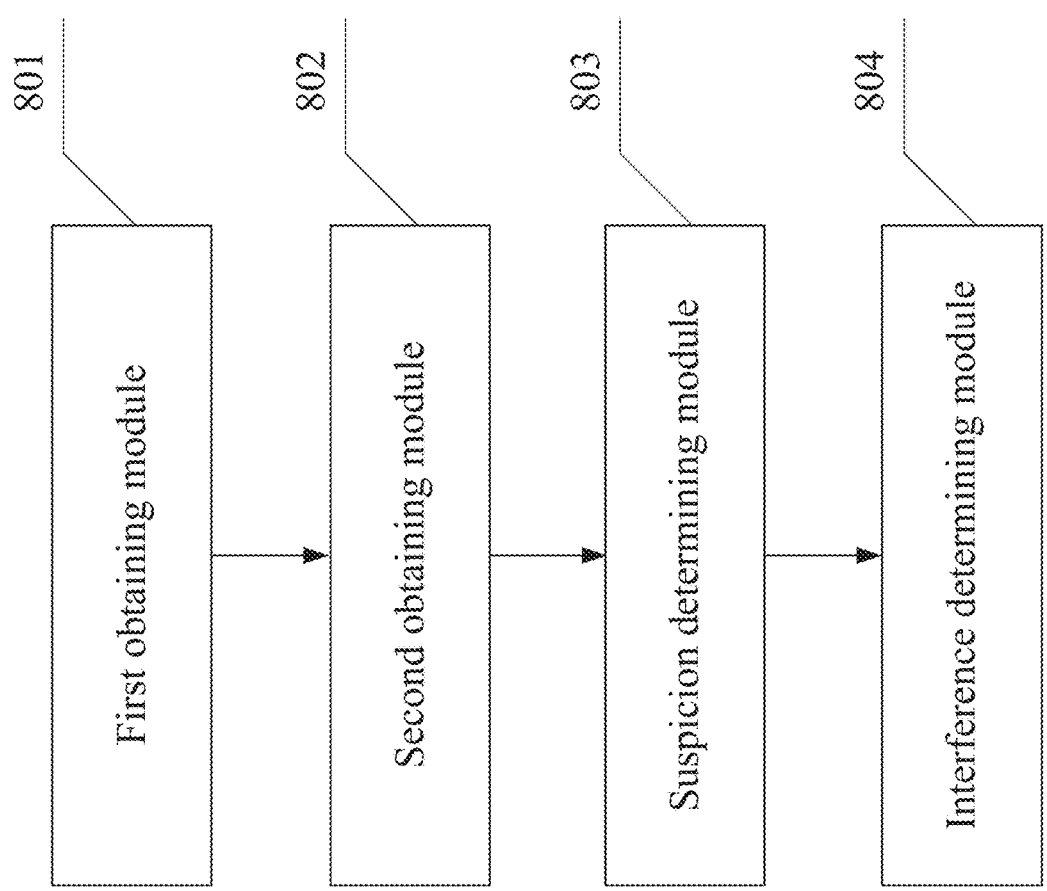
FIG. 8 is a schematic structural diagram of an interference point determining apparatus according to an embodiment of this application.

FIG. 8 is a schematic structural diagram of an interference point determining apparatus according to an exemplary embodiment of this application. The interference point determining apparatus can be implemented as all or a part of the apparatus through software, hardware, or a combination thereof. The apparatus includes a first obtaining module 801, a second obtaining module 802, a suspicion determining module 803, and an interference determining module 804.

The first obtaining module 801 is configured to obtain a target point cloud corresponding to a highly reflective object from a target channel, where a distance between the highly reflective object and multi-channel LiDAR is greater than or equal to a first distance threshold and is less than a second distance threshold, and reflectivity of the highly reflective object is greater than or equal to a first reflectivity threshold.

The second obtaining module 802 is configured to obtain a to-be-determined point cloud at the same pixel position as the target point cloud from each channel other than the target channel based on the target point cloud.

The suspicion determining module 803 is configured to: based on a distance value and a reflectivity of each to-be-determined point cloud, and based on distance values and reflectivities respectively corresponding to other point clouds in a neighborhood of each to-be-determined point cloud, determine whether each to-be-determined point cloud is a suspected interference point.

The interference determining module 804 is configured to: if the to-be-determined point cloud is the suspected interference point, based on a variance between distance values of the other point clouds in the neighborhood of the to-be-determined point cloud and the to-be-determined point cloud, or based on an interference point range corresponding to the to-be-determined point cloud, determine whether the to-be-determined point cloud is the interference point.

In an exemplary embodiment, the interference determining module 804 includes:
a first determining unit, configured to: if the variance between the distance values of the other point clouds in the neighborhood of the to-be-determined point cloud and the to-be-determined point cloud is greater than or equal to a variance threshold, or a ratio of the number of first point clouds in the neighborhood of the to-be-determined point cloud to the number of all point clouds in the neighborhood of the to-be-determined point cloud is less than a statistical number threshold, determine that the to-be-determined point cloud is the interference point, where the first point cloud is a point cloud satisfying that an absolute value of a difference between a distance value of the first point cloud in the neighborhood of the to-be-determined point cloud and the distance value of the to-be-determined point cloud is less than a third distance threshold; or a second determining unit, configured to: if the interference point range corresponding to the to-be-determined point cloud is in a highly reflective range, determine that the to-be-determined point cloud is the interference point, where the highly reflective range is a point cloud range to which a point cloud range corresponding to the highly reflective object is mapped in each channel other than the target channel.

In an exemplary embodiment, the interference determining module 804 further includes:

a range obtaining unit, configured to obtain the point cloud range corresponding to the highly reflective object from the target channel; and a mapping obtaining unit, configured to: based on each point cloud in the point cloud range corresponding to the highly reflective object, determine a point cloud at the same pixel position as each point cloud in the point cloud range corresponding to the highly reflective object from each channel other than the target channel, to obtain a point cloud range to which the point cloud range corresponding to the highly reflective object is mapped in each channel other than the target channel.

In an exemplary embodiment, the range obtaining unit includes:

a determining subunit, configured to determine, from the target channel, a second point cloud satisfying that an absolute value of a difference between a distance value of the second point cloud and a distance value of the target point cloud is less than a fourth distance threshold and that an absolute value of a difference between reflectivity of the second point cloud and reflectivity of the target point cloud is less than a second reflectivity threshold, where the number of second point clouds is greater than 1; and a range subunit, configured to: based on the second point cloud, determine the point cloud range corresponding to the highly reflective object from the target channel.

In an exemplary embodiment, the interference determining module 804 includes:

a third determining unit, configured to determine, from the channel corresponding to the to-be-determined point cloud, a third point cloud satisfying that an absolute value of a difference between a distance value of the third point cloud and the distance value of the to-be-determined point cloud is less than a fourth distance threshold, where the number of third point clouds is greater than or equal to 0; and a range determining unit, configured to: based on the third point cloud, determine the interference point range corresponding to the to-be-determined point cloud.

In an exemplary embodiment, the first obtaining module 801 includes:

a preliminary correspondence unit, configured to: based on a distance value and a reflectivity of the target point cloud, determine whether the target point cloud is preliminarily corresponding to the highly reflective object; and a high-reflectivity determining unit, configured to: if the target point cloud is preliminarily corresponding to the highly reflective object, based on the distance values and the reflectivities respectively corresponding to the other point clouds in the neighborhood of the target point cloud, determine that the target point cloud is corresponding to the highly reflective object.

In an exemplary embodiment, the preliminary correspondence unit is configured to: if the distance value of the target point cloud is less than the second distance threshold and greater than or equal to the first distance threshold, and the reflectivity of the target point cloud is greater than or equal to the first reflectivity threshold, determine that the target point cloud is preliminarily corresponding to the highly reflective object.

In an exemplary embodiment, the high-reflectivity determining unit includes:

a fourth determining subunit, configured to determine, from the neighborhood of the target point cloud, a fourth point cloud satisfying that an absolute value of a difference between a distance value of the fourth point cloud and the distance value of the target point cloud is less than a fifth distance threshold, and determine a fifth point cloud whose reflectivity is greater than or equal to a third reflectivity threshold, where the number of fourth point clouds and the number of fifth point clouds are respectively greater than or equal to 0; and a high-reflectivity determining subunit, configured to: if a ratio of the number of fourth point clouds to the number of all point clouds in the neighborhood corresponding to the target point cloud is greater than or equal to a first statistical distance threshold, and a ratio of the number of fifth point clouds to the number of all the point clouds in the neighborhood corresponding to the target point cloud is greater than or equal to a first statistical reflectivity threshold, determine that the target point cloud is corresponding to the highly reflective object.

In an exemplary embodiment, the suspicion determining module 803 includes:

a target correspondence unit, configured to: based on whether the reflectivity of the to-be-determined point cloud is less than a fourth reflectivity threshold and whether an absolute value of a difference between the distance value of the to-be-determined point cloud and the distance value of the target point cloud is less than the third distance threshold, determine whether the to-be-determined point cloud is corresponding to the target point cloud; and a suspicion determining unit, configured to: if the reflectivity of the to-be-determined point cloud is less than the fourth reflectivity threshold and the absolute value of the difference between the distance value of the to-be-determined point cloud and the distance value of the target point cloud is less than the third distance threshold, based on the distance values and the reflectivities respectively corresponding to the other point clouds in the neighborhood of the to-be-determined point cloud, determine whether the to-be-determined point cloud is the suspected interference point.

In an exemplary embodiment, the suspicion determining unit includes:

a fifth determining subunit, configured to determine, from the neighborhood of the to-be-determined point cloud, a first point cloud satisfying that an absolute value of a difference between a distance value of the first point cloud and the distance value of the to-be-determined point cloud is less than the third distance threshold, and determine a sixth point cloud whose reflectivity is less than the fourth reflectivity threshold, where the number of first point clouds and the number of sixth point clouds are respectively greater than or equal to 0; and a suspicion determining subunit, configured to: if the number of first point clouds is greater than or equal to the second statistical distance threshold, and a ratio of the number of sixth point clouds to the number of all the point clouds in the neighborhood corresponding to the to-be-determined point cloud is greater than or equal to the second statistical reflectivity threshold, determine the to-be-determined point cloud as the suspected interference point.

In an exemplary embodiment, the interference point determining apparatus further includes:

a zero-valued module, configured to determine the number of zero-valued point clouds in the neighborhood of the target point cloud, where the distance value and the reflectivity of the zero-valued point cloud are both 0;

a determining module, configured to: based on the distance value and the reflectivity of the target point cloud collected from the target channel, and the distance values and the reflectivities respectively corresponding to the other point clouds in the neighborhood of the target point cloud, determine whether the target point cloud is corresponding to the highly reflective object; and a correspondence module, configured to: based on the distance value and the reflectivity of the target point cloud collected from the target channel, the distance values and the reflectivities respectively corresponding to the other point clouds in the neighborhood of the target point cloud, and the number of zero-valued point clouds in the neighborhood of the target point cloud, determine whether the target point cloud is corresponding to the highly reflective object.

This application solves the problem in the related art that the pseudo image point cloud caused by crosstalk between channels of the multi-channel LiDAR cannot be effectively determined. A target point cloud corresponding to the highly reflective object within the preset distance range is obtained from the target channel, another to-be-determined point cloud at the same pixel position as the target point cloud is further obtained from the another channel. By using the variance between the distance values of other point clouds in the neighborhood of the to-be-determined point cloud and the to-be-determined point cloud, or using the interference point range of the to-be-determined point cloud, it is determined whether the to-be-determined point cloud is a pseudo image point cloud caused by crosstalk. In this application, the interference point in the channel can be effectively determined, to rule out the interference point and prevent the interference point from causing the LiDAR to erroneously determine a pseudo target object. In addition, in the determining method in this application, a point cloud generated by a real target object can be prevented from being erroneously determined as the interference point, which otherwise affects ranging accuracy and driving safety, thereby effectively improving the identification accuracy of the LiDAR.

It should be noted that, when the interference point determining apparatus provided in the foregoing embodiment performs the interference point determining method, a division of the foregoing functional modules is used as an example for illustration. In actual application, the foregoing functions can be allocated to different functional modules for implementation based on a requirement, that is, an inner structure of the device is divided into different functional modules to implement all or some of the functions described above. In addition, embodiments of the interference point determining apparatus and the interference point determining method provided above pertain to a same concept. For a specific implementation process, refer to the method embodiments. Details are not described herein again.

Serial numbers of the embodiments of this application are only intended for description, and do not indicate advantages or disadvantages of the embodiments.

An embodiment of this application further provides a computer storage medium. The computer storage medium may store a plurality of instructions. The instructions are capable of being loaded by a processor to perform the interference point determining method in the embodiments shown in FIG. 1 to FIG. 7. For a specific execution process, refer to the specific description of the embodiments shown in FIG. 1 to FIG. 7. Details are not described herein again.

This application further provides a computer program product. The computer program product stores at least one instruction. The at least one instruction is capable of being loaded by the processor to perform the interference point determining method in the embodiments shown in FIG. 1 to FIG. 7. For a specific execution process, refer to the specific description of the embodiments shown in FIG. 1 to FIG. 7. Details are not described herein again.

Figure 9:
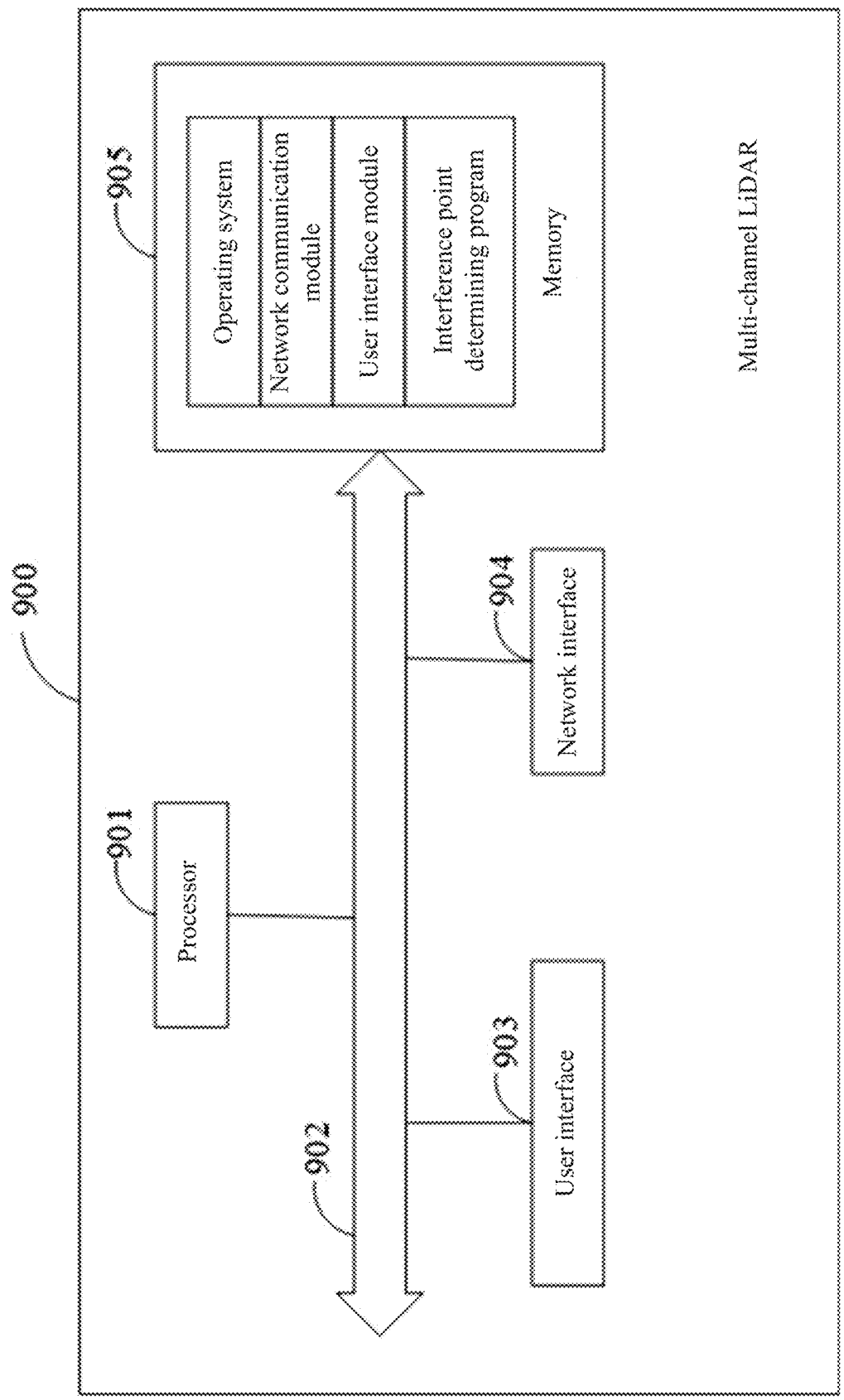
FIG. 9 is a schematic structural diagram of multi-channel LiDAR according to an embodiment of this application.

FIG. 9 is a schematic structural diagram of a multi-channel LiDAR according to an embodiment of this application. As shown in FIG. 9, the multi-channel LiDAR 900 may include: at least one processor 901, at least one network interface 904, a user interface 903, a memory 905, and at least one communication bus 902.

Herein, the communication bus 902 is configured to implement a connection and communication between these components.

Herein, the user interface 903 may include a standard wired interface and a wireless interface.

Herein, the network interface 904 may include a standard wired interface and a wireless interface (such as a Wi-Fi interface).

Herein, the processor 901 may include one or more processing cores. The processor 901 uses various interfaces and lines to connect various parts of the entire server 900, and executes various functions and processes data of the server 905 by running or executing instructions, programs, code sets, or instruction sets stored in the memory 905, and invoking data stored in the memory 900. In some embodiments, the processor 901 may be realized in at least one hardware form of digital signal processing (DSP), a field-programmable gate array (FPGA), or a programmable logic array (PLA). The processor 901 may integrate a combination of one or more of a central processing unit (CPU), a graphics processing unit (GPU), a modem, or the like. The GPU is configured to render and draw content that needs to be displayed on a display. The modem is configured to process wireless communication. It may be understood that the forgoing modem may not be integrated into the processor 901, and may be implemented by one chip independently.

The memory 905 may include a random access memory (RAM), or a read-only memory (ROM). In some embodiments, the memory 905 includes a non-transitory computer-readable medium. The memory 905 may be configured to store the instructions, the programs, the codes, the code sets or the instruction sets. The memory 905 may include a program storage region and a data storage region. The program storage region may store instructions for implementing the operating system, instructions for at least one function (such as a touch control function, a sound play function, and an image play function), and instructions for implementing each of the foregoing method embodiments.

The data storage region may store the data involved in each of the above embodiments. In some embodiments, the memory 905 may also be at least one storage device distant from the forgoing processor 901. As shown in FIG. 9, as a computer storage medium, the memory 905 may include an operating system, a network communication module, a user interface module, and an interference point determining program.

In the multi-channel LiDAR 900 shown in FIG. 9, the user interface 903 is mainly configured to provide an input interface for a user to obtain data input by the user; and the processor 901 can be used to invoke the interference point determining program stored in the memory 905, and perform the following operations:

obtaining a target point cloud corresponding to a highly reflective object from a target channel, where a distance between the highly reflective object and the multi-channel LiDAR is greater than or equal to a first distance threshold and is less than a second distance threshold, and a reflectivity of the highly reflective object is greater than or equal to a first reflectivity threshold;

obtaining a to-be-determined point cloud at the same pixel position as the target point cloud from each channel other than the target channel based on the target point cloud;

based on a distance value and a reflectivity of each to-be-determined point cloud, and based on distance values and reflectivities respectively corresponding to other point clouds in a neighborhood of each to-be-determined point cloud, determining whether each to-be-determined point cloud is a suspected interference point; and if the to-be-determined point cloud is the suspected interference point, based on a variance between the distance values of the other point clouds in the neighborhood of the to-be-determined point cloud and the to-be-determined point cloud, or based on an interference point range corresponding to the to-be-determined point cloud, determining whether the to-be-determined point cloud is the interference point.

In an exemplary embodiment, if the to-be-determined point cloud is the suspected interference point, based on a variance between the distance values of the other point clouds in the neighborhood of the to-be-determined point cloud and the to-be-determined point cloud, or based on an interference point range corresponding to the to-be-determined point cloud, when determining whether the to-be-determined point cloud is the interference point, the processor 901 is configured to:

if the variance between the distance values of the other point clouds in the neighborhood of the to-be-determined point cloud and the to-be-determined point cloud is greater than or equal to a variance threshold, or a ratio of the number of first point clouds in the neighborhood of the to-be-determined point cloud to the number of all point clouds in the neighborhood of the to-be-determined point cloud is less than a statistical number threshold, determine that the to-be-determined point cloud is the interference point, where the first point cloud is a point cloud satisfying that an absolute value of a difference between a distance value of the first point cloud in the neighborhood of the to-be-determined point cloud and the distance value of the to-be-determined point cloud is less than a third distance threshold; or if the interference point range corresponding to the to-be-determined point cloud is in a highly reflective range, determine that the to-be-determined point cloud is the interference point, where the highly reflective range is a point cloud range to which a point cloud range corresponding to the highly reflective object is mapped in each channel other than the target channel.

In an exemplary embodiment, before the step of if the interference point range corresponding to the to-be-determined point cloud is in a highly reflective range, determining that the to-be-determined point cloud is the interference point, the processor 901 is configured to:

obtain the point cloud range corresponding to the highly reflective object from the target channel; and based on each point cloud in the point cloud range corresponding to the highly reflective object, determine a point cloud at the same pixel position as each point cloud in the point cloud range corresponding to the highly reflective object from each channel other than the target channel, to obtain a point cloud range to which the point cloud range corresponding to the highly reflective object is mapped in each channel other than the target channel.

In an exemplary embodiment, when obtaining the point cloud range corresponding to the highly reflective object from the target channel, the processor 901 is configured to:

determine, from the target channel, a second point cloud satisfying that an absolute value of a difference between a distance value of the second point cloud and the distance value of the target point cloud is less than a fourth distance threshold and that an absolute value of a difference between reflectivity of the second point cloud and reflectivity of the target point cloud is less than a second reflectivity threshold, where the number of second point clouds is greater than 1; and based on the second point cloud, determine the point cloud range corresponding to the highly reflective object from the target channel.

In an exemplary embodiment, based on an interference point range corresponding to the to-be-determined point cloud, when determining whether the to-be-determined point cloud is the interference point, the processor 901 is configured to:

determine, from the channel corresponding to the to-be-determined point cloud, a third point cloud satisfying that an absolute value of a difference between a distance value of the third point cloud and the distance value of the to-be-determined point cloud is less than a fourth distance threshold, where the number of third point clouds is greater than or equal to 0; and based on the third point cloud, determine the interference point range corresponding to the to-be-determined point cloud.

In an exemplary embodiment, when obtaining the target point cloud corresponding to a highly reflective object from the target channel, the processor 901 is configured to:

based on a distance value and reflectivity of the target point cloud, determine whether the target point cloud is preliminarily corresponding to the highly reflective object; and if the target point cloud is preliminarily corresponding to the highly reflective object, based on the distance values and the reflectivities respectively corresponding to the other point clouds in the neighborhood of the target point cloud, determine that the target point cloud is corresponding to the highly reflective object.

In an exemplary embodiment, based on a distance value and a reflectivity of the target point cloud, when determining whether the target point cloud is preliminarily corresponding to the highly reflective object, the processor 901 is configured to:

if the distance value of the target point cloud is less than the second distance threshold and greater than or equal to the first distance threshold, and the reflectivity of the target point cloud is greater than or equal to the first reflectivity threshold, determine that the target point cloud is preliminarily corresponding to the highly reflective object.

In an exemplary embodiment, if the target point cloud is preliminarily corresponding to the highly reflective object, based on the distance values and the reflectivities respectively corresponding to the other point clouds in the neighborhood of the target point cloud, when determining that the target point cloud is corresponding to the highly reflective object, the processor 901 is configured to:

determine, from the neighborhood of the target point cloud, a fourth point cloud satisfying that an absolute value of a difference between a distance value of the fourth point cloud and the distance value of the target point cloud is less than a fifth distance threshold, and determine a fifth point cloud whose reflectivity is greater than or equal to a third reflectivity threshold, where the number of fourth point clouds and the number of fifth point clouds are respectively greater than or equal to 0; and if a ratio of the number of fourth point clouds to the number of all point clouds in the neighborhood corresponding to the target point cloud is greater than or equal to a first statistical distance threshold, and a ratio of the number of fifth point clouds to the number of all the point clouds in the neighborhood corresponding to the target point cloud is greater than or equal to a first statistical reflectivity threshold, determine that the target point cloud is corresponding to the highly reflective object.

In an exemplary embodiment, based on a distance value and a reflectivity of each to-be-determined point cloud and distance values and reflectivities respectively corresponding to other point clouds in a neighborhood of each to-be-determined point cloud, when determining whether each to-be-determined point cloud is a suspected interference point, the processor 901 is configured to:

based on whether the reflectivity of the to-be-determined point cloud is less than a fourth reflectivity threshold and whether an absolute value of a difference between the distance value of the to-be-determined point cloud and the distance value of the target point cloud is less than the third distance threshold, determine whether the to-be-determined point cloud is corresponding to the target point cloud; and if the reflectivity of the to-be-determined point cloud is less than the fourth reflectivity threshold and the absolute value of the difference between the distance value of the to-be-determined point cloud and the distance value of the target point cloud is less than the third distance threshold, based on the distance values and the reflectivities respectively corresponding to the other point clouds in the neighborhood of the to-be-determined point cloud, determine whether the to-be-determined point cloud is the suspected interference point.

In an exemplary embodiment, if the reflectivity of the to-be-determined point cloud is less than the fourth reflectivity threshold and the absolute value of the difference between the distance value of the to-be-determined point cloud and the distance value of the target point cloud is less than the third distance threshold, based on the distance values and the reflectivities respectively corresponding to the other point clouds in the neighborhood of the to-be-determined point cloud, when determining whether the to-be-determined point cloud is the suspected interference point, the processor 901 is configured to:

determine, from the neighborhood of the to-be-determined point cloud, a first point cloud satisfying that an absolute value of a difference between a distance value of the first point cloud and the distance value of the to-be-determined point cloud is less than the third distance threshold, and determine a sixth point cloud whose reflectivity is less than the fourth reflectivity threshold, where the number of first point clouds and the number of sixth point clouds are respectively greater than or equal to 0; and if the number of first point clouds is greater than or equal to the second statistical distance threshold, and a ratio of the number of sixth point clouds to the number of all the point clouds in the neighborhood corresponding to the to-be-determined point cloud is greater than or equal to the second statistical reflectivity threshold, determine the to-be-determined point cloud as the suspected interference point.

In an exemplary embodiment, before the step of based on the distance value and the reflectivity of the target point cloud collected from the target channel, and the distance values and the reflectivities respectively corresponding to the other point clouds in the neighborhood of the target point cloud, determining whether the target point cloud is corresponding to the highly reflective object, the processor 901 is further configured to:

determine the number of zero-valued point clouds in the neighborhood of the target point cloud, where the distance value and the reflectivity of the zero-valued point cloud are both 0, where based on the distance value and reflectivity of the target point cloud collected from the target channel, and the distance values and the reflectivities respectively corresponding to the other point clouds in the neighborhood of the target point cloud, determine whether the target point cloud is corresponding to the highly reflective object includes:

based on the distance value and the reflectivity of the target point cloud collected from the target channel, the distance values and the reflectivities respectively corresponding to the other point clouds in the neighborhood of the target point cloud, and the number of zero-valued point clouds in the neighborhood of the target point cloud, determine whether the target point cloud is corresponding to the highly reflective object.

This application solves the problem in the related art that the pseudo image point cloud caused by crosstalk between channels of the multi-channel LiDAR cannot be effectively determined, A target point cloud corresponding to the highly reflective object within the preset distance range is obtained from the target channel, another to-be-determined point cloud at the same pixel position as the target point cloud is further obtained from the another channel. By using the variance between the distance values of other point clouds in the neighborhood of the to-be-determined point cloud and the to-be-determined point cloud, and using the interference point range of the to-be-determined point cloud, it is determined whether the to-be-determined point cloud is a pseudo image point cloud caused by crosstalk. In this application, the interference point in the channel can be effectively determined, to rule out the interference point and prevent the interference point from causing the LiDAR. to erroneously determine a pseudo target object. In addition, in the determining method in this application, a point cloud generated by a real target object can be prevented from being erroneously determined as the interference point, which otherwise affects ranging accuracy and driving safety, thereby effectively improving the identification accuracy of the LiDAR.

The person skilled in the art can understand that all or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, the read-only storage memory or the random storage memory, and so on.

The disclosed forgoing are only embodiments of the present application, which cannot be used to limit the scope of rights of the present application. Therefore, equivalent changes made in accordance with the claims of the present application still fall within the scope of the application.

What is claimed is:

1. A method for determining an interference point, applied to a multi-channel LiDAR, wherein the multi-channel LiDAR comprises multiple channels, and the method comprises:
    obtaining a target point cloud corresponding to a highly reflective object from a target channel, wherein a distance between the highly reflective object and the multi-channel LiDAR is greater than or equal to a first distance threshold and is less than a second distance threshold, and a reflectivity of the highly reflective object is greater than or equal to a first reflectivity threshold;
    obtaining, based on the target point cloud, a to-be-determined point cloud at a same pixel position as the target point cloud from each of the multiple channels other than the target channel;
    based on a distance value and a reflectivity of each to-be-determined point cloud, and based on distance values and reflectivities respectively corresponding to other point clouds in a neighborhood of each to-be-determined point cloud, determining whether each to-be-determined point cloud is a suspected interference point; and
    if one to-be-determined point cloud is the suspected interference point, based on a variance between the distance values of the other point clouds in the neighborhood of the one to-be-determined point cloud and the one to-be-determined point cloud, or based on an interference point range corresponding to the one to-be-determined point cloud, determining whether the one to-be-determined point cloud is the interference point.

2. The method according to claim 1, wherein determining whether the one to-be-determined point cloud is the interference point comprises:
    if the variance between the distance values of the other point clouds in the neighborhood of the one to-be-determined point cloud and the one to-be-determined point cloud is greater than or equal to a variance threshold, or a ratio of a number of first point clouds in the neighborhood of the one to-be-determined point cloud to a number of all point clouds in the neighborhood of the one to-be-determined point cloud is less than a statistical number threshold, determining that the one to-be-determined point cloud is the interference point, wherein the first point cloud is a point cloud satisfying that an absolute value of a difference between a distance value of the first point cloud in the neighborhood of the one to-be-determined point cloud and the distance value of the to-be-determined point cloud is less than a third distance threshold; or
    if the interference point range corresponding to the one to-be-determined point cloud is in a highly reflective range, determining that the one to-be-determined point cloud is the interference point, wherein the highly reflective range is a point cloud range to which a point cloud range corresponding to the highly reflective object is mapped in each channel other than the target channel.

3. The method according to claim 2, wherein before determining that the one to-be-determined point cloud is the interference point, the method comprises:
    obtaining the point cloud range corresponding to the highly reflective object from the target channel; and
    based on each point cloud in the point cloud range corresponding to the highly reflective object, determining a point cloud at the same pixel position as each point cloud in the point cloud range corresponding to the highly reflective object from each channel other than the target channel, to obtain a point cloud range to which the point cloud range corresponding to the highly reflective object is mapped in each channel other than the target channel.

4. The method according to claim 3, wherein obtaining the point cloud range corresponding to the highly reflective object from the target channel comprises:
    determining, from the target channel, a second point cloud satisfying that an absolute value of a difference between a distance value of the second point loud and a distance value of the target point cloud is less than a fourth distance threshold and that an absolute value of a difference between a reflectivity of the second point cloud and a reflectivity of the target point cloud is less than a second reflectivity threshold, wherein a number of second point clouds is greater than 1; and
    based on the second point cloud, determining the point cloud range corresponding to the highly reflective object from the target channel.

5. The method according to claim 1, wherein based on the interference point range corresponding to one the to-be-determined point cloud, determining whether the one to-be-determined point cloud is the interference point comprises:
    determining, from the channel corresponding to the one to-be-determined point cloud, a third point cloud satisfying that an absolute value of a difference between a distance value of the third point cloud and the distance value of the one to-be-determined point cloud is less than a fourth distance threshold, wherein a number of third point clouds is greater than or equal to 0; and
    based on the third point cloud, determining the interference point range corresponding to the one to-be-determined point cloud.

6. The method according to claim 1, wherein obtaining the target point cloud corresponding to the highly reflective object from the target channel comprises:
    based on a distance value and the reflectivity of the target point cloud, determining whether the target point cloud is preliminarily corresponding to the highly reflective object; and
    if the target point cloud is preliminarily corresponding to the highly reflective object, based on the distance values and the reflectivities respectively corresponding to the other point clouds in the neighborhood of the target point cloud, determining that the target point cloud is corresponding to the highly reflective object.

7. The method according to claim 6, wherein determining whether the target point cloud is preliminarily corresponding to the highly reflective object comprises:
   if the distance value of the target point cloud is less than the second distance threshold and greater than or equal to the first distance threshold, and the reflectivity of the target point cloud is greater than or equal to the first reflectivity threshold, determining that the target point cloud is preliminarily corresponding to the highly reflective object.

8. The method according to claim 6, wherein determining that the target point cloud is corresponding to the highly reflective object comprises:
   determining, from the neighborhood of the target point cloud, a fourth point cloud satisfying that an absolute value of a difference between a distance value of the fourth point cloud and the distance value of the target point cloud is less than a fifth distance threshold, and determining a fifth point cloud whose reflectivity is greater than or equal to a third reflectivity threshold, wherein a number of fourth point clouds and a number of fifth point clouds are respectively greater than or equal to 0; and
   if a ratio of the number of fourth point clouds to a number of all the point clouds in the neighborhood corresponding to the target point cloud is greater than or equal to a first statistical distance threshold, and a ratio of the number of fifth point clouds to the number of all the point clouds in the neighborhood corresponding to the target point cloud is greater than or equal to a first statistical reflectivity threshold, determining that the target point cloud is corresponding to the highly reflective object.

9. The method according to claim 6, wherein before determining that the target point cloud is corresponding to the highly reflective object, the method further comprises:
   determining a number of zero-valued point clouds in the neighborhood of the target point cloud, wherein distance values and reflectivities of the zero-valued point clouds are both 0,
   wherein determining that the target point cloud is corresponding to the highly reflective object comprises:
   based on the distance value and the reflectivity of the target point cloud collected from the target channel, the distance values and the reflectivities respectively corresponding to the other point clouds in the neighborhood of the target point cloud, and the number of zero-valued point clouds in the neighborhood of the target point cloud, determining whether the target point cloud is corresponding to the highly reflective object.

10. The method according to claim 1, determining whether each to-be-determined point cloud is a suspected interference point comprises:
    based on whether the reflectivity of the to-be-determined point cloud is less than a fourth reflectivity threshold and whether an absolute value of a difference between the distance value of the to-be-determined point cloud and the distance value of the target point cloud is less than a third distance threshold, determining whether the to-be-determined point cloud is corresponding to the target point cloud; and
    if the reflectivity of the to-be-determined point cloud is less than the fourth reflectivity threshold and the absolute value of the difference between the distance value of the to-be-determined point cloud and the distance value of the target point cloud is less than the third distance threshold, based on the distance values and the reflectivities respectively corresponding to the other point clouds in the neighborhood of the to-be-determined point cloud, determining whether the to-be-determined point cloud is the suspected interference point.

11. The method according to claim 10, wherein determining whether the to-be-determined point cloud is the suspected interference point comprises:
    determining, from the neighborhood of the to-be-determined point cloud, a first point cloud satisfying that an absolute value of a difference between a distance value of the first point cloud and the distance value of the to-be-determined point cloud is less than the third distance threshold, and determining a sixth point cloud whose reflectivity is less than the fourth reflectivity threshold, wherein a number of first point clouds and a number of sixth point clouds are respectively greater than or equal to 0; and
    if the number of first point clouds is greater than or equal to a second statistical distance threshold, and a ratio of the number of sixth point clouds to a number of all the point clouds in the neighborhood corresponding to the to-be-determined point cloud is greater than or equal to a second statistical reflectivity threshold, determining the to-be-determined point cloud as the suspected interference point.

12. An interference point determining apparatus, comprising:
    a first obtaining module, configured to obtain a target point cloud corresponding to a highly reflective object from a target channel, wherein a distance between the highly reflective object and a multi-channel LiDAR is greater than or equal to a first distance threshold and is less than a second distance threshold, and a reflectivity of the highly reflective object is greater than or equal to a first reflectivity threshold;
    a second obtaining module, configured to obtain, based on the target point cloud, a to-be-determined point cloud at a same pixel position as the target point cloud from each channel other than the target channel of the multi-channel LiDAR;
    a suspicion determining module, configured to: based on a distance value and a reflectivity of each to-be-determined point cloud, and based on distance values and reflectivities respectively corresponding to other point clouds in a neighborhood of each to-be-determined point cloud, determine whether each to-be-determined point cloud is a suspected interference point; and
    an interference determining module, configured to: if one to-be-determined point cloud is the suspected interference point, based on a variance between distance values of the other point clouds in the neighborhood of the one to-be-determined point cloud and the one to-be-determined point cloud, or based on an interference point range corresponding to the one to-be-determined point cloud, determine whether the one to-be-determined point cloud is the interference point.

13. A multi-channel LiDAR, comprising a processor and a memory, wherein the memory stores a computer program, and the computer program is capable of being loaded by the processor to perform the method according to claim 1.

* * * * *